United States Patent
Tsuna et al.

(10) Patent No.: US 12,509,606 B2
(45) Date of Patent: Dec. 30, 2025

(54) PRETREATMENT LIQUID FOR IMPERMEABLE BASE MATERIAL, INK SET, BASE MATERIAL FOR IMAGE RECORDING, METHOD OF PRODUCING BASE MATERIAL FOR IMAGE RECORDING, IMAGE RECORDED MATERIAL, AND IMAGE RECORDING METHOD

(71) Applicant: FUJIFILM Corporation, Tokyo (JP)

(72) Inventors: Fumiko Tsuna, Ashigarakami-gun (JP); Toshihiro Kariya, Ashigarakami-gun (JP); Shota Suzuki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/897,718

(22) Filed: Aug. 29, 2022

(65) Prior Publication Data

US 2023/0042114 A1    Feb. 9, 2023

Related U.S. Application Data

(63) Continuation of application No. PCT/JP2021/006195, filed on Feb. 18, 2021.

(30) Foreign Application Priority Data

Mar. 19, 2020    (JP) .................. 2020-049715

(51) Int. Cl.
  *C09D 11/54*    (2014.01)
  *B41M 5/00*    (2006.01)
  *C09D 11/033*    (2014.01)
  *C09D 11/107*    (2014.01)
  *C09D 11/40*    (2014.01)

(52) U.S. Cl.
  CPC ............ *C09D 11/54* (2013.01); *B41M 5/0017* (2013.01); *C09D 11/033* (2013.01); *C09D 11/107* (2013.01); *C09D 11/40* (2013.01)

(58) Field of Classification Search
  CPC ........ B41M 5/00; B41M 5/0017; B41M 5/52; C09D 11/033; C09D 11/10; C09D 11/107; C09D 11/322; C09D 11/40; C09D 11/54
  See application file for complete search history.

(56) References Cited

U.S. PATENT DOCUMENTS

| | | |
|---|---|---|
| 2013/0249996 A1 | 9/2013 | Saito et al. |
| 2015/0062267 A1 | 3/2015 | Maeda et al. |
| 2015/0166819 A1 | 6/2015 | Shinohara |
| 2018/0056691 A1 | 3/2018 | Arai et al. |
| 2019/0010349 A1 | 1/2019 | Shimono et al. |
| 2020/0317944 A1 | 10/2020 | Fukagawa et al. |
| 2020/0368691 A1 | 11/2020 | Kamimura et al. |
| 2020/0376877 A1 | 12/2020 | Shirokane et al. |
| 2021/0130639 A1 | 5/2021 | Sugihara et al. |

FOREIGN PATENT DOCUMENTS

| | | |
|---|---|---|
| CN | 111787995 A | 10/2020 |
| EP | 2 535 379 A1 | 12/2012 |
| EP | 3 858 630 A1 | 8/2021 |
| JP | 2002-302627 A | 10/2002 |
| JP | 2016-057645 A | 4/2016 |
| JP | 2018-035270 A | 3/2018 |
| JP | 2018-202843 A | 12/2018 |
| JP | 2019-059855 A | 4/2019 |
| JP | 2019-111687 A | 7/2019 |
| JP | 2019-111763 A | 7/2019 |
| JP | 2019-177560 A | 10/2019 |
| WO | 2014/050751 A1 | 4/2014 |
| WO | 2017/163738 A1 | 9/2017 |
| WO | 2018/180693 A1 | 10/2018 |
| WO | 2018/181992 A1 | 10/2018 |
| WO | 2019/131532 A1 | 7/2019 |
| WO | 2019/181440 A1 | 9/2019 |
| WO | 2019/188852 A1 | 10/2019 |

OTHER PUBLICATIONS

Office Action dated Mar. 28, 2023 from the Japanese Patent Office in JP Application No. 2022-508152.
International Search Report dated May 11, 2021, issued in International Application No. PCT/JP2021/006195.
Written Opinion dated May 11, 2021, issued in International Application No. PCT/JP2021/006195.
International Preliminary Report on Patentability dated Sep. 20, 2022, issued in International Application No. PCT/JP2021/006195.
Communication dated Apr. 5, 2024, issued in Chinese Application No. 202180021026.2.
Extended European Search Report issued Jul. 28, 2023 in European Application No. 21771048.2.
Communication issued Feb. 25, 2025 in Chinese Application No. 202180021026.2.
Office Action issued Nov. 9, 2024 in Chinese Application No. 202180021026.2.

*Primary Examiner* — Mark Ruthkosky
*Assistant Examiner* — Sathavaram I Reddy
(74) *Attorney, Agent, or Firm* — Sughrue Mion, PLLC

(57) ABSTRACT

A pretreatment liquid for an impermeable base material includes an anionic resin, and an aqueous medium, in which the anionic resin has a C log P value of 1.40 or greater, and a content of a structural unit derived from an alkyl (meth) acrylate containing a chain alkyl group having 2 or more carbon atoms in the anionic resin is less than 5% by mass with respect to a total mass of the anionic resin.

8 Claims, No Drawings

PRETREATMENT LIQUID FOR IMPERMEABLE BASE MATERIAL, INK SET, BASE MATERIAL FOR IMAGE RECORDING, METHOD OF PRODUCING BASE MATERIAL FOR IMAGE RECORDING, IMAGE RECORDED MATERIAL, AND IMAGE RECORDING METHOD

CROSS-REFERENCE TO RELATED APPLICATIONS

This application is a Continuation of PCT International Application No. PCT/JP2021/006195 filed on Feb. 18, 2021, which claims priority under 35 U.S.C. § 119(a) to Japanese Patent Application No. 2020-049715 filed on Mar. 19, 2020. Each of the above application(s) is hereby expressly incorporated by reference, in its entirety, into the present application.

BACKGROUND OF THE INVENTION

1. Field of the Invention

The present disclosure relates to a pretreatment liquid for an impermeable base material, an ink set, a base material for image recording, a method of producing a base material for image recording, an image recorded material, and an image recording method.

2. Description of the Related Art

In the related art, various examinations have been conducted on image recording carried out using an ink and a treatment liquid.

For example, JP2019-177560A describes a receiving solution for an ink composition that contains a polyvalent metal salt, a water-soluble solvent, a resin, and a surfactant, in which the resin contains at least a part of a resin emulsion, the polyvalent metal salt contains a polyvalent metal ion and an anion, and the receiving solution contains a surfactant having an HLB value of 9 or greater and 19 or less and having a specific structure as the surfactant.

JP2019-111687A describes a primer, in which a polymer of an ethylenically unsaturated monomer is dispersed in an aqueous medium by an emulsifier, and the ethylenically unsaturated monomer contains a resin fine particle dispersion containing 15% to 40% by weight of a (meth)acrylate having an ethylene oxide chain, an aggregating agent, a protic organic solvent, and water.

JP2019-111763A describes a pretreatment liquid used with an aqueous ink jet ink containing a pigment and water, in which the pretreatment liquid contains resin fine particles, a surfactant, an aggregating agent, and water, the surfactant contains polyoxyalkylene alkyl ether, the aggregating agent contains a polyvalent metal salt and/or a cationic polymer compound, and the aggregating agent has a moisture absorptivity of 75% by mass or less at a relative humidity of 80%.

As described in JP2019-177560A, JP2019-111687A, and JP2019-111763A, an image recording method of recording an image by applying a pretreatment liquid onto a base material and applying an ink onto the surface of the base material onto which the pretreatment liquid has been applied is known.

SUMMARY OF THE INVENTION

However, it was found that in a case where an impermeable base material is used as a base material in image recording carried out using a pretreatment liquid and an ink, streak unevenness may occur because the spread of dots (dot diameter) formed by fixing ink droplets on the base material is insufficient.

Therefore, in an image recording method of recording an image by applying a pretreatment liquid onto an impermeable base material and applying an ink onto the surface of the base material onto which the pretreatment liquid has been applied, it may be required to further spread dots, that is, to further increase the dot diameter.

The present disclosure has been made in view of the above-described circumstances, and an object to be achieved by an aspect of the present invention is to provide a pretreatment liquid for an impermeable base material which is capable of further spreading dots, an ink set, a base material for image recording, a method of producing a base material for image recording, and an image recording method.

Further, an object to be achieved by another aspect of the present invention is to provide an image recorded material on which more widely spread dots have been formed.

The present disclosure includes the following aspects.

<1> A pretreatment liquid for an impermeable base material, comprising: an anionic resin; and an aqueous medium, in which the anionic resin has a C log P value of 1.40 or greater, and a content of a structural unit derived from an alkyl (meth)acrylate containing a chain alkyl group having 2 or more carbon atoms in the anionic resin is less than 5% by mass with respect to a total mass of the anionic resin.

<2> The pretreatment liquid for an impermeable base material according to <1>, in which the anionic resin has a structural unit derived from an anionic group-containing monomer, and the anionic group-containing monomer has a C log P value of −4.00 or greater.

<3> The pretreatment liquid for an impermeable base material according to <1> or <2>, in which the anionic resin has at least one group selected from the group consisting of a sulfo group and a salt of the sulfo group.

<4> The pretreatment liquid for an impermeable base material according to any one of <1> to <3>, in which the anionic resin has at least one structural unit selected from the group consisting of a structural unit represented by Formula (1) and a structural unit represented by Formula (2),

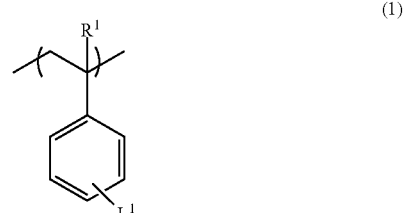

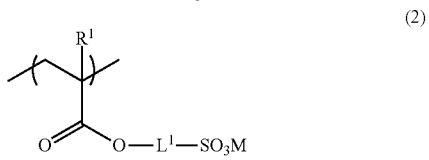

in Formulae (1) and (2), $R^1$'s each independently represent a hydrogen atom or a methyl group, $L^1$'s each independently represent a divalent group which is one selected from the first group consisting of an alkylene group having 1 to 10 carbon atoms, an arylene group having 6 to 10 carbon atoms, —O—, —NH—, —S—, —C(=O)—, and —CH(—OH)—, a divalent group which is obtained by combining two or more selected from the first group, or a single bond, and M's each independently represent a hydrogen atom or a cation.

<5> The pretreatment liquid for an impermeable base material according to any one of <1> to <4>, in which the anionic resin has a structural unit derived from a hydrogen bonding group-containing monomer, and the hydrogen bonding group-containing monomer has a C log P value of 0.20 or greater.

<6> The pretreatment liquid for an impermeable base material according to <5>, in which the structural unit derived from the hydrogen bonding group-containing monomer is at least one selected from the group consisting of a structural unit represented by Formula (3) and a structural unit represented by Formula (4),

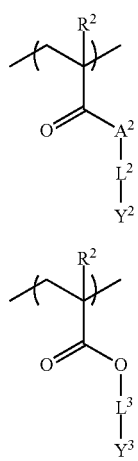

(3)

(4)

in Formulae (3) and (4), $R^2$'s each independently represent a hydrogen atom or an alkyl group having 1 to 4 carbon atoms, in Formula (3), $A^2$ represents —NH— or —N($L^4$-$Y^4$)—, $L^2$ represents a divalent group which is one selected from the second group consisting of an alkylene group, an alkenylene group, an alkynylene group, an arylene group, —O—, —NH—, —N($L^4$-$Y^4$)—, and —C(=O)—, a divalent group which is obtained by combining two or more selected from the second group, or a single bond, $Y^2$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$, and two of $A^2$, $L^2$, and $Y^2$ may be linked to each other to form a ring, in Formula (4), $L^3$ represents a divalent group which is one selected from the second group or a divalent group which is obtained by combining two or more selected from the second group, $Y^3$ represents a halogen atom, —OH, —$NH_2$, —$NR^3H$, or —C(=O)$R^3$, $L^3$ and $Y^3$ may be linked to each other to form a ring, $L^4$ represents a divalent group which is one selected from the third group consisting of an alkylene group, an alkenylene group, an alkynylene group, an arylene group, —O—, —NH—, and —C(=O)—, a divalent group which is obtained by combining two or more selected from the third group, or a single bond, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(=O)$R^3$, and $R^3$ and $R^4$ each independently represent an alkyl group, an alkenyl group, an alkynyl group, or an aryl group, in Formulae (3) and (4), $L^4$ and $Y^4$ in —N($L^4$-$Y^4$)— may be linked to each other to form a ring, and $R^3$ and $R^4$ in —$NR^3R^4$ may be linked to each other to form a ring.

<7> The pretreatment liquid for an impermeable base material according to <6>, in which $Y^2$ in Formula (3) and $Y^3$ in Formula (4) represent —OH, —$NH_2$, or —$NR^3H$.

<8> The pretreatment liquid for an impermeable base material according to any one of <5> to <7>, in which a content of the structural unit derived from the hydrogen bonding group-containing monomer is in a range of 5% by mass to 50% by mass with respect to the total mass of the anionic resin.

<9> The pretreatment liquid for an impermeable base material according to any one of <1> to <8>, in which the anionic resin has at least one selected from the group consisting of structural units represented by Formulae (A) to (F),

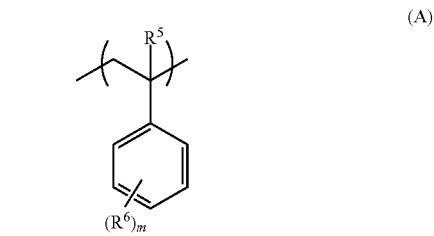

(A)

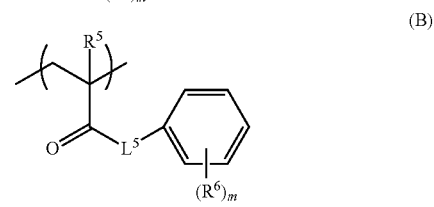

(B)

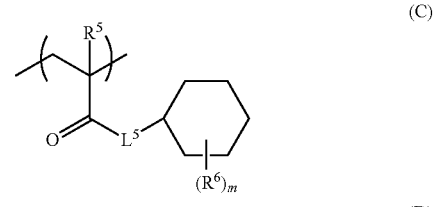

(C)

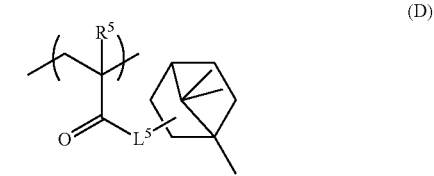

(D)

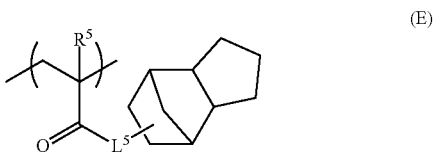

(E)

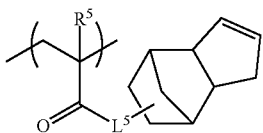

in Formulae (A) to (F), $R^5$'s each independently represent a hydrogen atom or a methyl group, $R^6$'s each independently represent an alkyl group, an alkenyl group, or an alkynyl group, m represents an integer of 0 to 5, and n represents an integer of 0 to 11, and $L^5$ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond.

<10> The pretreatment liquid for an impermeable base material according to any one of <1> to <9>, in which the anionic resin has a glass transition temperature of −30° C. or higher and lower than 100° C.

<11> An ink set comprising: the pretreatment liquid for an impermeable base material according to any one of <1> to <10>; and an ink containing a colorant and water.

<12> A base material for image recording, comprising: an impermeable base material; and a pretreatment layer which is provided on at least one surface of the impermeable base material and contains a solid content in the pretreatment liquid for an impermeable base material according to any one of <1> to <10>.

<13> An image recorded material comprising: an impermeable base material; and an image which includes a pretreatment layer provided on at least one surface of the impermeable base material and containing a solid content in the pretreatment liquid for an impermeable base material according to any one of <1> to <10> and a colorant.

<14> A method of producing a base material for image recording, comprising: a step of applying the pretreatment liquid for an impermeable base material according to any one of <1> to <10> onto an impermeable base material.

<15> An image recording method comprising: a step of applying the pretreatment liquid for an impermeable base material according to any one of <1> to <10> onto an impermeable base material; and a step of applying an ink containing a colorant and water onto a surface of the impermeable base material onto which the pretreatment liquid for an impermeable base material has been applied, using an ink jet recording method to record an image.

According to the present disclosure, it is possible to provide a pretreatment liquid for an impermeable base material which is capable of further spreading dots, an ink set, a base material for image recording, a method of producing a base material for image recording, and an image recording method.

Further, according to the present disclosure, it is possible to provide an image recorded material on which more widely spread dots have been formed.

DESCRIPTION OF THE PREFERRED EMBODIMENTS

Hereinafter, a pretreatment liquid for an impermeable base material, an ink set, the base material for image recording, a method of producing a base material for image recording, an image recorded material, and an image recording method of the present disclosure will be described in detail.

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, the concept of "(meth)acryl" includes both acryl and methacryl, and the concept of "(meth)acrylate" includes both acrylate and methacrylate.

In the present disclosure, "*" in a chemical formula represents a bonding position.

In the present disclosure, a combination of two or more preferable aspects is a more preferable aspect.

[Pretreatment Liquid for Impermeable Base Material]

A pretreatment liquid for an impermeable base material of the present disclosure (hereinafter, also simply referred to as "pretreatment liquid") contains an anionic resin and water, in which the anionic resin has a C log P value of 1.40 or greater, and the content of a structural unit derived from an alkyl (meth)acrylate containing a chain alkyl group having 2 or more carbon atoms in the anionic resin is less than 5% by mass with respect to the total mass of the anionic resin.

The pretreatment liquid of the present disclosure is a pretreatment liquid used to be applied to an impermeable base material. Specifically, the pretreatment liquid of the present disclosure is applied to an impermeable base material in advance before an image is recorded on the impermeable base material. An image can be recorded by applying an ink onto the surface of the impermeable base material onto which the pretreatment liquid has been applied.

In the present disclosure, the "image" indicates a film obtained by combining a layer derived from the pretreatment liquid (hereinafter, also referred to as a "pretreatment layer") with a layer derived from the ink (hereinafter, also referred to as an "ink layer"). The pretreatment layer is disposed between the impermeable base material and the ink layer. Here, the interface between the ink layer and the pretreatment layer does not necessarily have to be clear.

For example, the composition of the image (film) may change continuously in a layer thickness direction.

Further, the concept of "image" in the present disclosure also includes a solid image.

In the present disclosure, for example, the ink is ejected as liquid droplets from a nozzle provided in an ink jet head, lands on an impermeable base material, and is fixed in the form of dots after a solvent contained in the liquid droplets (hereinafter, also referred to as "ink droplets") consisting of the ink is evaporated.

In the present disclosure, "dots" denote an adhesive material formed on the impermeable base material due to landing of the ink droplets. Further, "dot diameter" denotes the size of a dot.

According to the pretreatment liquid of the present disclosure, the dots can be further spread. Hereinafter, these effects will be described in detail.

In the related art, an image recording method of recording an image by applying a pretreatment liquid containing a resin and an aqueous medium onto a base material and applying an ink onto the surface of the base material onto which the pretreatment liquid has been applied is known (see JP2019-177560A, JP2019-111687A, and JP2019-111763A).

It was found that in a case where an impermeable base material is used as a base material in image recording carried out using a pretreatment liquid and an ink, the ink droplets are unlikely to spread on the base material. Further, in recent years, there is a demand for an increase in speed of image recording, but it was found that streak unevenness is likely to occur because the spread of dots formed by fixing ink droplets is insufficient in a case where the speed of image recording is increased. In this regard, based on the examination conducted by the present inventors, it was found that in a case where a pretreatment liquid contains an anionic resin and water, in which the anionic resin has a C log P value of 1.40 or greater, and the content of a structural unit derived from an alkyl (meth)acrylate containing a chain alkyl group having 2 or more carbon atoms in the anionic resin is less than 5% by mass with respect to the total mass of the anionic resin, dots can be further spread.

In a case where the C log P value of the anionic resin is 1.40 or greater, mixing of a pretreatment layer formed by applying the pretreatment liquid onto the impermeable base material and an ink layer formed by applying the ink is suppressed. In a case where mixing of the pretreatment layer and the ink layer is suppressed, the ink droplets landed on the surface of the impermeable base material onto which the pretreatment liquid has been applied spread, and thus the dots can be further spread.

Further, in a case where the content of the structural unit derived from the alkyl (meth)acrylate containing a chain alkyl group having 2 or more carbon atoms in the anionic resin is less than 5% by mass with respect to the total mass of the anionic resin, the anionic resin is unlikely to be exposed to the air interface, and the wettability of the surface of the impermeable base material onto which the pretreatment liquid has been applied can be improved. Due to the improvement of the wettability, the ink droplets landed on the surface of the impermeable base material onto which the pretreatment liquid has been applied spread, and thus the dots can be further spread.

<Impermeable Base Material>

The pretreatment liquid of the present disclosure is a pretreatment liquid used to be applied to an impermeable base material. In the present disclosure, the impermeability in the impermeable base material denotes a property that the water absorption rate in 24 hours which is measured in conformity with ASTM D570-98 (2018) is 2.5% or less. Here, the unit "%" of the water absorption rate is on a mass basis. The water absorption rate is preferably 1.0% or less and more preferably 0.5% or less.

Examples of the material of the impermeable base material include glass, a metal (such as aluminum, zinc, or copper), and a resin (such as polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, nylon, or an acrylic resin).

It is preferable that the material of the impermeable base material is a resin.

Examples of the material of the impermeable base material are as described above, but polypropylene, polyethylene, polyethylene terephthalate, nylon, an acrylic resin, or polyvinyl chloride is preferable from the viewpoint of versatility.

As the shape of the impermeable base material, a sheet-like (film-like) or a plate-like impermeable base material is preferable. Examples of the impermeable base material having such a shape include a glass plate, a metal plate, a resin sheet (resin film), paper on which plastic is laminated, paper on which a metal is laminated or vapor-deposited, and a plastic sheet (plastic film) on which a metal is laminated or vapor-deposited.

Examples of the impermeable base material made of a resin include a resin sheet (resin film), and more specific examples thereof include a flexible packaging material for packaging food or the like and a panel for guiding the floor of a mass retailer.

Examples of the impermeable base material include a textile (woven fabric) or non-woven fabric formed of impermeable fibers in addition to a sheet-like (film-like) or plate-like impermeable base material.

Further, the thickness of the impermeable base material is preferably in a range of 0.1 μm to 1,000 μm, more preferably in a range of 0.1 μm to 800 μm, and still more preferably in a range of 1 μm to 500 μm.

The impermeable base material may be subjected to a hydrophilization treatment. Examples of the hydrophilization treatment include a corona treatment, a plasma treatment, a heat treatment, an abrasion treatment, a light irradiation treatment (such as a UV treatment), and a flame treatment, but the hydrophilization treatment is not limited thereto. The corona treatment can be performed using, for example, Corona Master (product name, "PS-10S", manufactured by Shinko Electric & Instrumentation Co., Ltd.). The conditions for the corona treatment may be appropriately selected according to the kind of the impermeable base material and the like.

The pretreatment liquid according to the present disclosure is used for an impermeable base material, but may be used for both an impermeable base material and a permeable base material (for example, permeable paper, a permeable textile, or permeable non-woven fabric). Here, the permeability of the permeable base material denotes the above-described property that the water absorption rate is greater than 2.5%.

Next, each component contained in the pretreatment liquid of the present disclosure will be described.

<Aqueous Medium>

The pretreatment liquid of the present disclosure contains an aqueous medium.

Examples of the aqueous medium include water and a water-soluble organic solvent. It is preferable that the aqueous medium is water or a water-soluble organic solvent.

Examples of water include ion exchange water and distilled water.

In the present disclosure, the term "water-soluble" denotes a property that 1 g or greater (preferably 3 g or greater and more preferably 10 g or greater) of a substance is dissolved in 100 g of water at 25° C.

The aqueous medium contained in the pretreatment liquid of the present disclosure may be used alone or in combination of two or more kinds thereof.

The content of the aqueous medium is preferably 50% by mass or greater, more preferably 60% by mass or greater, and still more preferably 70% by mass or greater with respect to the total mass of the pretreatment liquid.

The upper limit of the content of the aqueous medium depends on the amount of other components such as the anionic resin, but is, for example, 95% by mass, preferably 90% by mass, and more preferably 85% by mass.

In a case where the pretreatment liquid contains water, the content of water is preferably 50% by mass or greater, more preferably 60% by mass or greater, and still more preferably 70% by mass or greater with respect to the total mass of the pretreatment liquid.

The upper limit of the content of water depends on the amount of other components such as the anionic resin, but is, for example, 95% by mass, preferably 90% by mass, and more preferably 85% by mass.

Examples of the water-soluble organic solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-42150A.

Among these, from the viewpoint of improving blocking resistance, polyhydric alcohol or polyhydric alcohol ether is preferable, and an alkanediol, polyalkylene glycol, or polyalkylene glycol ether is more preferable as the water-soluble organic solvent.

In a case where the pretreatment liquid contains a water-soluble organic solvent, the content of the water-soluble organic solvent is preferably in a range of 1% by mass to 25% by mass, more preferably in a range of 2% by mass to 20% by mass, and still more preferably in a range of 3% by mass to 15% by mass with respect to the total mass of the pretreatment liquid.

<Anionic Resin>

The pretreatment liquid of the present disclosure contains an anionic resin. The anionic resin denotes a resin containing at least one anionic group in a molecule. Examples of the anionic group include a carboxy group, a salt of the carboxy group, a sulfo group, a salt of the sulfo group, a phosphoric acid group, a salt of the phosphoric acid group, a phosphonic acid group, and a salt of the phosphonic acid group. Examples of the counterion in a salt include an alkali metal ion such as a sodium ion, a potassium ion, or a lithium ion, an alkaline earth metal ion such as a calcium ion or a magnesium ion, and an ammonium ion.

The anionic resin may contain only one or two or more kinds of anionic groups. Further, in a case where the anionic group is a salt, the salt may be dissociated in the pretreatment liquid.

From the viewpoint of improving the storage stability of the pretreatment liquid, it is preferable that the anionic resin is a polymer having a structural unit derived from a monomer containing an anionic group (hereinafter, simply referred to as "anionic group-containing monomer").

Among such examples, from the viewpoint of further improving the storage stability of the pretreatment liquid, the anionic resin contains preferably at least one group selected from the group consisting of a sulfo group and a salt of the sulfo group and more preferably a structural unit derived from a monomer containing at least one group selected from the group consisting of a sulfo group and a salt of the sulfo group. In a case where the anionic resin contains at least one group selected from the group consisting of a sulfo group and a salt of the sulfo group, the dispersion stability of the anionic resin in the pretreatment liquid is high, and thus the storage stability of the pretreatment liquid is further improved.

(Structural Unit Derived from Anionic Group-Containing Monomer)

In the present disclosure, the anionic resin has a structural unit derived from an anionic group-containing monomer, and the C log P value of the anionic group-containing monomer is preferably −4.00 or greater, more preferably −3.90 or greater, and still more preferably −3.80 or greater. The upper limit of the C log P value of the anionic group-containing monomer is not particularly limited, but is preferably −0.50 from the viewpoint of the manufacturing suitability.

The expression "C log P value of the anionic group-containing monomer is −4.00 or greater" denotes that the hydrophobicity of the anionic group-containing monomer is high. In the present disclosure, it is considered that the hydrophobicity of the entire anionic resin can be improved by increasing the hydrophobicity of the structural unit derived from the anionic group-containing monomer constituting the anionic resin. Since the hydrophobicity of the anionic resin contained in the pretreatment liquid is high, mixing of the pretreatment layer and the ink layer is suppressed in a case where the pretreatment liquid is applied onto the impermeable base material and the ink is applied onto the surface of the impermeable base material onto which the pretreatment liquid has been applied. In a case where mixing of the pretreatment layer and the ink layer is suppressed, the ink droplets landed on the surface of the impermeable base material onto which the pretreatment liquid has been applied spread, and thus the dots can be further spread.

In the present disclosure, the C log P value is calculated using ChemDraw (registered trademark) Professional ver. 16.0.1.4 (manufactured by PerkinElmer Informatics).

Hereinafter, specific examples of the anionic group-containing monomer and the C log P value of each monomer will be described. Examples of the anionic group-containing monomer having a C log P value of −4.00 or greater include SEANa, SPAK, SEMNa, SPMK, MMANa, SSNa, and P-1MNa. Examples of the anionic group-containing monomer having a C log P value of −4.00 or greater and containing at least one group selected from the group consisting of a sulfo group and a salt of the sulfo group include SEANa, SPAK, SEMNa, SPMK, and SSNa.

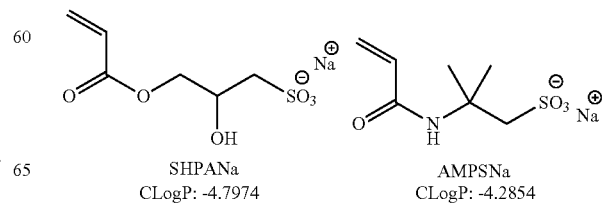

SHPANa
CLogP: -4.7974

AMPSNa
CLogP: -4.2854

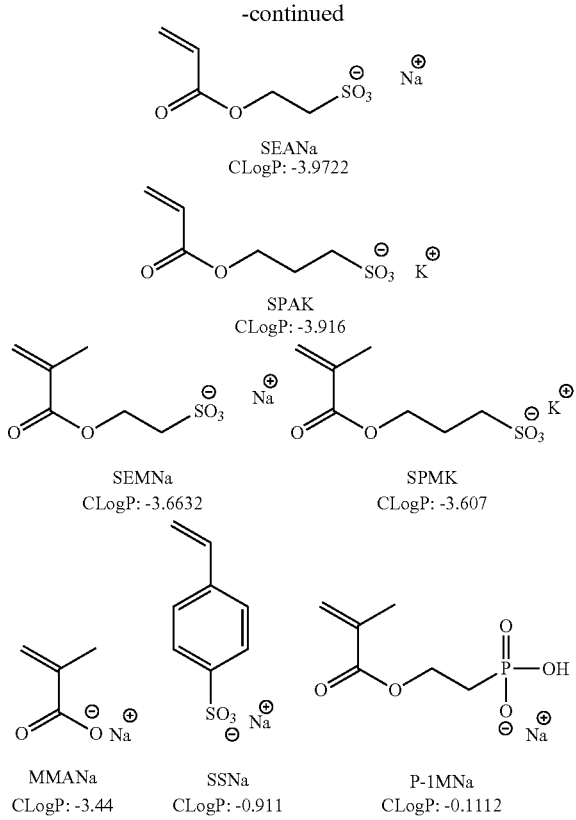

From the viewpoint of further spreading dots, it is preferable that the anionic resin has at least one structural unit selected from the group consisting of a structural unit represented by Formula (1) and a structural unit represented by Formula (2) as the structural unit derived from the anionic group-containing monomer.

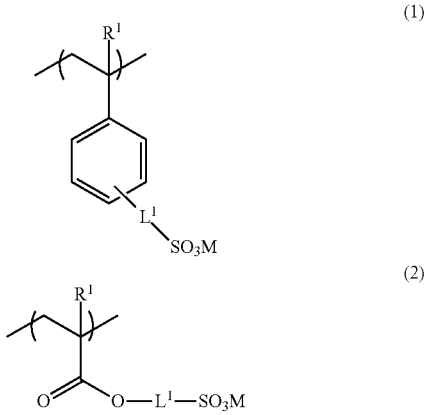

In Formulae (1) and (2), $R^1$'s each independently represent a hydrogen atom or a methyl group, $L^1$'s each independently represent a divalent group which is one selected from the first group consisting of an alkylene group having 1 to 10 carbon atoms, an arylene group having 6 to 10 carbon atoms, —O—, —NH—, —S—, —C(=O)—, and —CH(—OH)—, a divalent group which is obtained by combining two or more selected from the first group, or a single bond, and M represents a hydrogen atom or a cation.

In Formulae (1) and (2), the alkylene group having 1 to 10 carbon atoms represented by $L^1$ may be linear or may have a branched structure and/or a cyclic structure. Further, the number of carbon atoms of the alkylene group is preferably in a range of 1 to 4.

In Formulae (1) and (2), examples of the arylene group having 6 to 10 carbon atoms as $L^1$ include a phenylene group and a naphthalene group.

In Formulae (1) and (2), it is preferable that "divalent group which is obtained by combining two or more selected from the first group" as $L^1$ is a divalent group obtained by combining at least one selected from the group consisting of an alkylene group having 1 to 10 carbon atoms and an arylene group having 6 to 10 carbon atoms and at least one selected from the group consisting of —O—, —NH—, —S—, —C(=O)—, and —CH(—OH)—.

It is preferable that $L^1$ represents an alkylene group having 1 to 10 carbon atoms or a single bond.

In Formulae (1) and (2), M's each independently represent a hydrogen atom or a cation. Examples of the cation represented by M include an alkali metal ion such as a sodium ion, a potassium ion, or a lithium ion; an alkaline earth metal ion such as a calcium ion or a magnesium ion; and an ammonium ion.

It is preferable that M represents a sodium ion, a potassium ion, a lithium ion, or an ammonium ion.

Examples of the monomer for forming the structural unit represented by Formula (1) and the structural unit represented by Formula (2) include vinylsulfonic acid, p-styrenesulfonic acid, α-methylstyrenesulfonic acid, 2-sulfoethyl (meth)acrylate, 3-sulfopropyl (meth)acrylate, methacryloyloxyethyl sulfonic acid, vinylbenzyl sulfonic acid, 1-allyloxy-2-hydroxypropanesulfonic acid, allyloxypolyethylene glycol (the repetition number of the ethylene glycol moiety: 10) sulfonic acid, and salts of these compounds. Examples of the counterion in a salt include the cations represented by M described above.

As the monomer for forming the structural unit represented by Formula (1) and the structural unit represented by Formula (2), p-styrenesulfonic acid, a salt of the p-styrenesulfonic acid, 3-sulfopropyl (meth)acrylate, or a salt of the 3-sulfopropyl (meth)acrylate is preferable.

Hereinafter, specific examples of the structural unit represented by Formula (1) and the structural unit represented by Formula (2) will be shown, but the structural unit represented by Formula (1) and the structural unit represented by Formula (2) are not limited to the following specific examples.

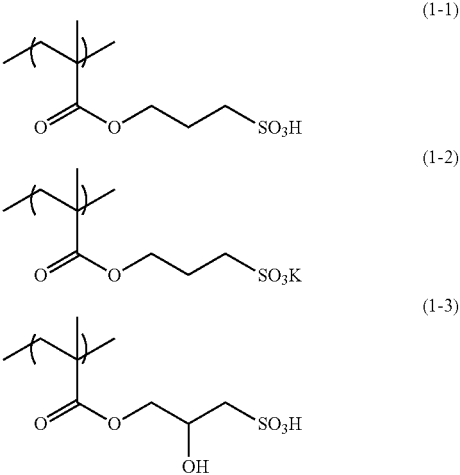

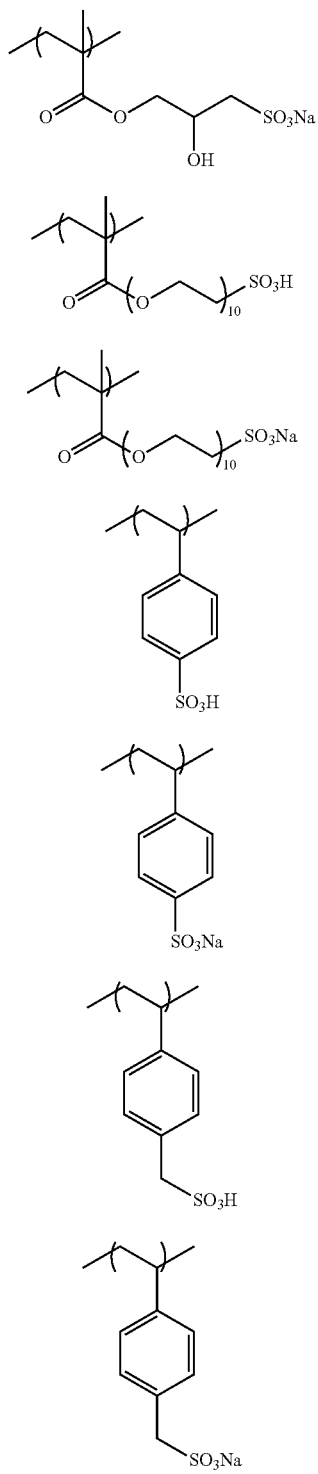

(1-4)
(1-5)
(1-6)
(2-1)
(2-2)
(2-3)
(2-4)

From the viewpoint of further spreading dots, it is preferable that the anionic resin has a structural unit derived from the anionic group-containing monomer, the C log P value of the anionic group-containing monomer is −4.00 or greater, and the structural unit derived from the anionic group-containing monomer is at least one selected from the group consisting of a structural unit represented by Formula (1) and a structural unit represented by Formula (2).

The anionic resin may contain only one or two or more kinds of structural units derived from the anionic group-containing monomer.

From the viewpoints of further spreading dots and improving the storage stability, the content of the structural unit derived from the anionic group-containing monomer is preferably in a range of 1% by mass to 15% by mass, more preferably in a range of 2% by mass to 13% by mass, and still more preferably in a range of 3% by mass to 11% by mass with respect to the total mass of the anionic resin.

Further, from the viewpoint of further spreading dots and improving the storage stability, the total content of the structural unit represented by Formula (1) and the structural unit represented by Formula (2) is preferably in a range of 1% by mass to 15% by mass, more preferably in a range of 2% by mass to 13% by mass, and still more preferably in a range of 3% by mass to 11% by mass with respect to the total mass of the anionic resin.

(Structural Unit Derived from Hydrogen Bonding Group-Containing Monomer)

In the present disclosure, the anionic resin has a structural unit derived from a monomer containing a hydrogen bonding group (hereinafter, simply referred to as "hydrogen bonding group-containing monomer"), and the C log P value of the hydrogen bonding group-containing monomer is preferably 0.20 or greater, more preferably 0.25 or greater, and still more preferably 0.30 or greater. The upper limit of the C log P value of the hydrogen bonding group-containing monomer is not particularly limited, but emulsion polymerization is unlikely to be carried out as the C log P value thereof increases. Therefore, the C log P value of the hydrogen bonding group-containing monomer is preferably 12.00 or less and more preferably 11.00 or less.

The expression "C log P value of the hydrogen bonding group-containing monomer is 0.20 or greater" denotes that the hydrogen bonding group-containing monomer has a high hydrophobicity. In the present disclosure, it is considered that the hydrophobicity of the entire anionic resin can be improved by increasing the hydrophobicity of the structural unit derived from the hydrogen bonding group-containing monomer constituting the anionic resin. Since the hydrophobicity of the anionic resin contained in the pretreatment liquid is high, mixing of the pretreatment layer and the ink layer is suppressed in a case where the pretreatment liquid is applied onto the impermeable base material and the ink is applied onto the surface of the base material onto which the pretreatment liquid has been applied. In a case where mixing of the pretreatment layer and the ink layer is suppressed, the ink droplets landed on the surface of the impermeable base material onto which the pretreatment liquid has been applied spread, and thus the dots can be further spread.

A hydrogen bonding group is a group that interacts via a hydrogen atom. Examples of the hydrogen bonding group include —CONH—, —OH, —NHCONH— and —NHCOO—.

Hereinafter, specific examples of the hydrogen bonding group-containing monomer and the C log P value of each monomer will be described.

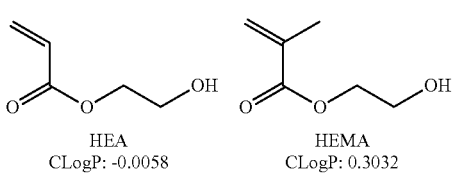

HEA
CLogP: -0.0058

HEMA
CLogP: 0.3032

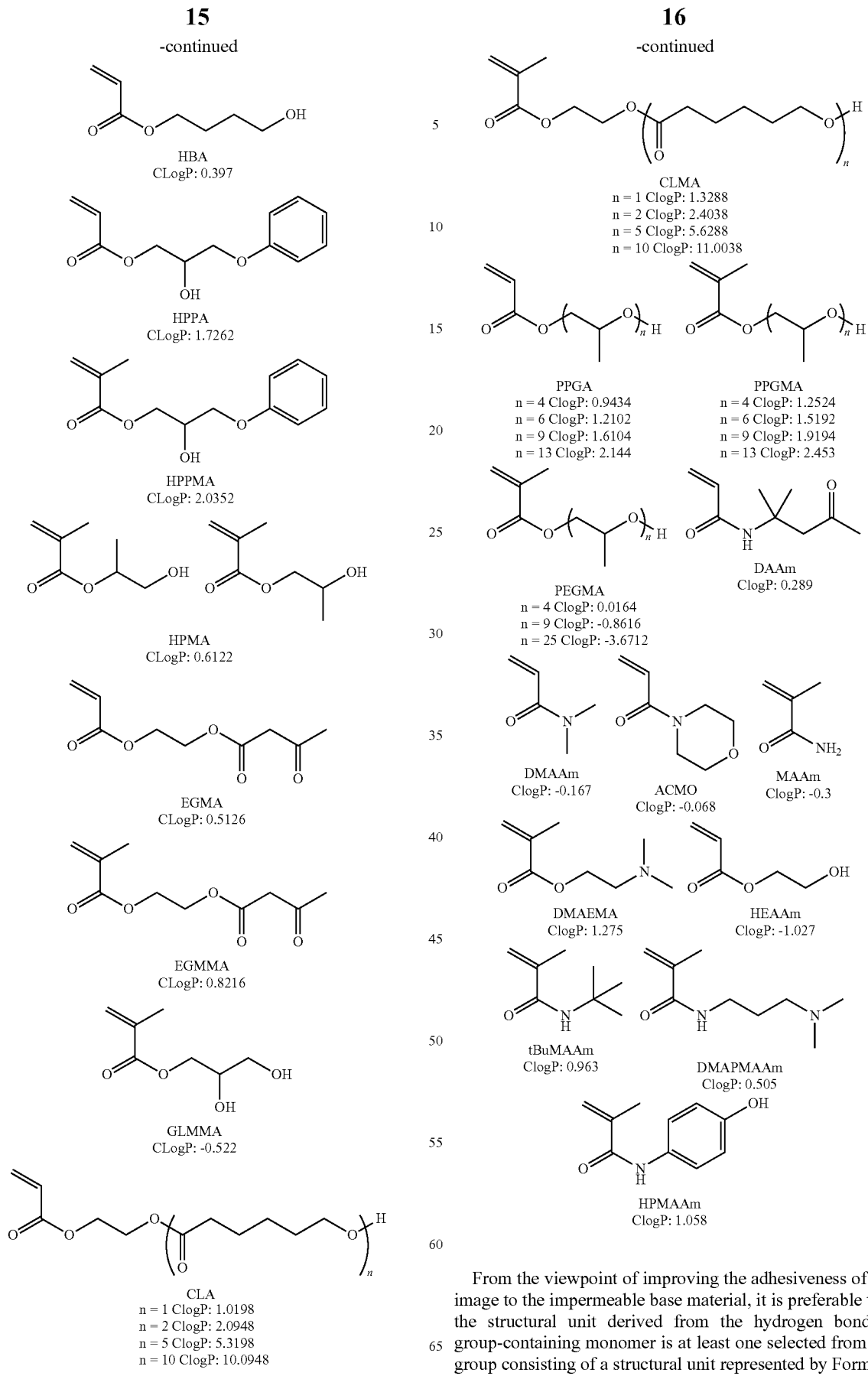
From the viewpoint of improving the adhesiveness of the image to the impermeable base material, it is preferable that the structural unit derived from the hydrogen bonding group-containing monomer is at least one selected from the group consisting of a structural unit represented by Formula (3) and a structural unit represented by Formula (4). It is considered that since the hydrogen bonding group in the hydrogen bonding group-containing monomer interacts with the impermeable base material, the adhesiveness of the image to the impermeable base material is improved.

—Structural Unit Represented by Formula (3)—

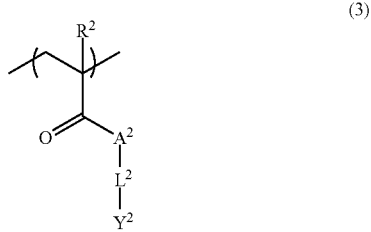

(3)

In Formula (3), $R^2$ represents a hydrogen atom or an alkyl group having 1 to 4 carbon atoms. It is preferable that $R^2$ represents a hydrogen atom or a methyl group.

In Formula (3), $A^2$ represents —NH— or —N($L^4$-$Y^4$)—. $L^4$ and $Y^4$ in —N($L^4$-$Y^4$)— may be linked to each other to form a ring. —N($L^4$-$Y^4$)— will be described below.

In Formula (3), $L^2$ represents a divalent group which is one selected from the second group consisting of an alkylene group, an alkenylene group, an alkynylene group, an arylene group, —O—, —NH—, —N($L^4$-$Y^4$)—, and —C(=O)—, a divalent group which is obtained by combining two or more selected from the second group, or a single bond.

In Formula (3), $Y^2$ represents an alkyl group, an alkenyl group, an alkynyl group, an aryl group, a halogen atom, —OH, —OR$^3$, —NH$_2$, —NR$^3$H, —NR$^3$R$^4$, or —C(=O)R$^3$. $R^3$ and $R^4$ each independently represent an alkyl group, an alkenyl group, an alkynyl group, or an aryl group. $R^3$ and $R^4$ in —NR$^3$R$^4$ may be linked to each other to form a ring.

In Formula (3), two of $A^2$, $L^2$, and $Y^2$ may be linked to each other to form a ring.

[$L^2$]

In Formula (3), $L^2$ represents a divalent group which is one selected from the second group consisting of an alkylene group, an alkenylene group, an alkynylene group, an arylene group, —O—, —NH—, —N($L^4$-$Y^4$)—, and —C(=O)—, a divalent group which is obtained by combining two or more selected from the second group, or a single bond.

The alkylene group, the alkenylene group, and the alkynylene group as $L^2$ may be linear or may have a branched structure and/or a cyclic structure.

As the alkylene group, an alkylene group having 1 to 10 carbon atoms is preferable, an alkylene group having 1 to 4 carbon atoms is more preferable, and a methylene group or an ethylene group is still more preferable.

As the alkenylene group, an alkenylene group having 2 to 10 carbon atoms is preferable, an alkenylene group having 2 to 4 carbon atoms is more preferable, and an alkenylene group having 2 or 3 carbon atoms is still more preferable.

As the alkynylene group, an alkynylene group having 2 to 10 carbon atoms is preferable, an alkynylene group having 2 to 4 carbon atoms is more preferable, and an alkynylene group having 2 or 3 carbon atoms is still more preferable.

As the arylene group as $L^2$, an arylene group having 6 to 10 carbon atoms is preferable, a phenylene group or a naphthylene group is more preferable, and a phenylene group is still more preferable.

Each of the alkylene group, the alkenylene group, and the alkynylene group as $L^2$ may have a substituent. It is preferable that the substituent is the same group as $Y^3$ in Formula (4) described below. That is, it is preferable that the substituent is at least one selected from the group consisting of a halogen atom, —OH, —OR$^3$, —NH$_2$, —NR$^3$H, —NR$^3$R$^4$, and —C(=O)R$^3$. $R^3$ and $R^4$ each independently represent an alkyl group, an alkenyl group, an alkynyl group, or an aryl group.

The arylene group as $L^2$ may have a substituent. It is preferable that the substituent is at least one selected from the group consisting of an alkyl group, an alkenyl group, an alkynyl group, an aryl group, a halogen atom, —OH, —OR$^3$, —NH$_2$, —NR$^3$H, —NR$^3$R$^4$, and —C(=O)R$^3$. $R^3$ and $R^4$ each independently represent an alkyl group, an alkenyl group, an alkynyl group, or an aryl group.

As "divalent group which is obtained by combining two or more selected from the second group" represented by $L^2$, a divalent group obtained by combining at least one of an alkylene group, an alkenylene group, an alkynylene group, or an arylene group and at least one of —O—, —NH—, —N($L^4$-$Y^4$)—, or —C(=O)— is preferable, and the following group (AO2) is particularly preferable.

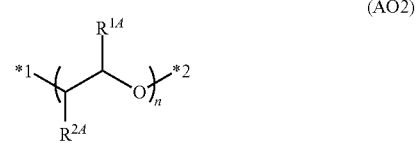

(AO2)

In the group (AO2), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to $A^2$, and *2 represents a bonding position with respect to $Y^2$. It is preferable that in a case where one of $R^{1A}$ and $R^{2A}$ represents a methyl group, the other represents a hydrogen atom.

$L^2$ represents preferably a single bond, an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, or a group (AO2) and more preferably a single bond or an alkylene group having 1 to 6 carbon atoms (more preferably 1 to 4 carbon atoms and still more preferably 1 or 2 carbon atoms).

[$Y^2$]

In Formula (3), $Y^2$ represents an alkyl group, an alkenyl group, an alkynyl group, an aryl group, a halogen atom, —OH, —OR$^3$, —NH$_2$, —NR$^3$H, —NR$^3$R$^4$, or —C(=O)R$^3$.

$R^3$ and $R^4$ each independently represent an alkyl group, an alkenyl group, an alkynyl group, or an aryl group.

As the halogen atom as $Y^2$, a fluorine atom, a chlorine atom, a bromine atom, or an iodine atom is preferable, a fluorine atom, a chlorine atom, or a bromine atom is more preferable, and a fluorine atom or a chlorine atom is still more preferable.

Each of the alkyl group, the alkenyl group, and the alkynyl group as $Y^2$ may be linear or may have a branched structure and/or a cyclic structure.

As the alkyl group, an alkyl group having 1 to 10 carbon atoms is preferable, an alkyl group having 1 to 4 carbon atoms is more preferable, and a methyl group or an ethyl group is still more preferable.

As the alkenyl group, an alkenyl group having 2 to 10 carbon atoms is preferable, an alkenyl group having 2 to 4 carbon atoms is more preferable, and an alkenyl group having 2 or 3 carbon atoms is still more preferable.

As the alkynyl group, an alkynyl group having 2 to 10 carbon atoms is preferable, an alkynyl group having 2 to 4 carbon atoms is more preferable, and an alkynyl group having 2 or 3 carbon atoms is still more preferable.

As the aryl group as $Y^2$, an aryl group having 6 to 10 carbon atoms is preferable, and a phenyl group or a naphthyl group is more preferable.

The aryl group as $Y^2$ may have a substituent. As the substituent, the same group as that represented by $Y^2$ (that is, at least one selected from the group consisting of an alkyl group, an alkenyl group, an alkynyl group, an aryl group, a halogen atom, —OH, —OR$^3$, —NH$_2$, —NR$^3$H, —NR$^3$R$^4$, and —C(=O)R$^3$, and R$^3$ and R$^4$ each independently represent an alkyl group, an alkenyl group, an alkynyl group, or an aryl group) is preferable.

It is preferable that $Y^2$ represents an alkyl group having 1 to 6 carbon atoms (more preferably 1 to 4 carbon atoms and still more preferably 1 or 2 carbon atoms), —OH, —OR$^3$, —NH$_2$, —NR$^3$H, —NR$^3$R$^4$, or —C(=O)R$^3$. It is preferable that R$^3$ and R$^4$ each independently represent an alkyl group having 1 to 6 carbon atoms (more preferably 1 to 4 carbon atoms and still more preferably 1 or 2 carbon atoms).

[—N(L$^4$-Y$^4$)—]

Next, —N(L$^4$-Y$^4$)— in A$^2$ and L$^2$ will be described.

In —N(L$^4$-Y$^4$)—, L$^4$ represents a divalent group which is one selected from the third group (that is, the third group consisting of an alkylene group, an alkenylene group, an alkynylene group, an arylene group, —O—, —NH—, and —C(=O)—), a divalent group which is obtained by combining two or more selected from the third group, or a single bond.

The third group is the same as the second group except that —N(L$^4$-Y$^4$)— is not included.

In —N(L$^4$-Y$^4$)—, Y$^4$ represents an alkyl group, an alkenyl group, an alkynyl group, an aryl group, a halogen atom, —OH, —OR$^3$, —NH$_2$, —NR$^3$H, —NR$^3$R$^4$, or —C(=O) R$^3$. R$^3$ and R$^4$ each independently represent an alkyl group, an alkenyl group, an alkynyl group, or an aryl group. R$^3$ and R$^4$ in —NR$^3$R$^4$ may be linked to each other to form a ring.

L$^4$ and Y$^4$ in —N(L$^4$-Y$^4$)— may be linked to each other to form a ring.

The preferred embodiment of L$^4$ in —N(L$^4$-Y$^4$)— is the same as the preferred embodiment of L$^2$.

L$^4$ in —N(L$^4$-Y$^4$)— represents preferably a single bond, an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, or the following group (AO4) and more preferably a single bond or an alkylene group having 1 to 6 carbon atoms (more preferably 1 to 4 carbon atoms and still more preferably 1 or 2 carbon atoms).

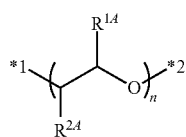
(AO4)

In the group (AO4), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to N (a nitrogen atom), and *2 represents a bonding position with respect to $Y^4$.

It is preferable that in a case where one of $R^{1A}$ and $R^{2A}$ represents a methyl group, the other represents a hydrogen atom.

The number of carbon atoms of the structural unit represented by Formula (3) is preferably 30 or less, more preferably 20 or less, still more preferably 12 or less, and even still more preferably 8 or less. Further, the number of carbon atoms is preferably 3 or greater and more preferably 4 or greater.

Further, in Formula (3), it is also preferable that "-A$^2$-L$^2$-Y$^2$" represents any one of the group (3A) to the group (3H) shown below. In the group (3A) to the group (3H), * represents a bonding position.

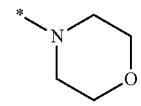
(3A)

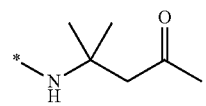
(3B)

(3C)

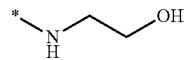
(3D)

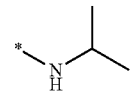
(3E)

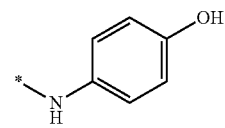
(3F)

3G)

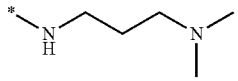
(3H)

Hereinafter, specific examples of the structural unit represented by Formula (3) will be shown, but the structural unit represented by Formula (3) is not limited to the following specific examples.

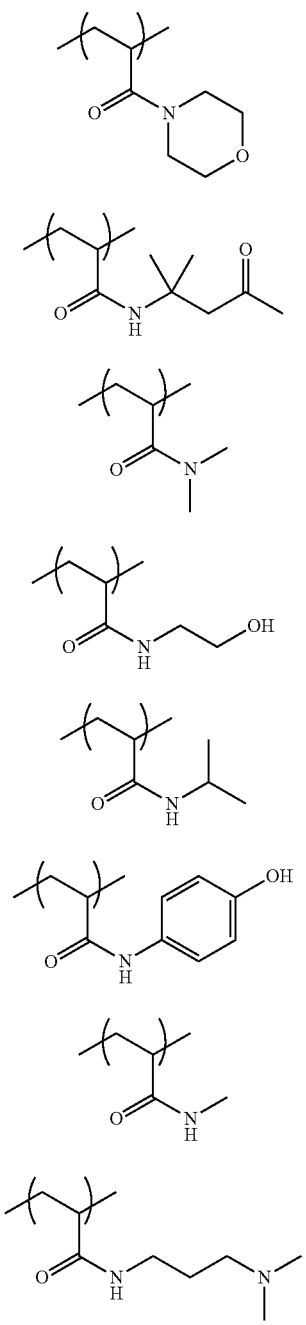

—Structural Unit Represented by Formula (4)—

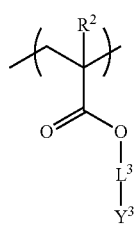

(4)

In Formula (4), $R^2$ represents a hydrogen atom or an alkyl group having 1 to 4 carbon atoms. It is preferable that $R^2$ represents a hydrogen atom or a methyl group.

In Formula (4), $L^3$ represents a divalent group which is one selected from the third group consisting of an alkylene group, an alkenylene group, an alkynylene group, an arylene group, —O—, —NH—, —N($L^4$-$Y^4$)—, and —C(=O)— or a divalent group which is obtained by combining two or more selected from the third group.

In Formula (4), $Y^3$ represents a halogen atom, —OH, —NH$_2$, —NR$^3$H, or —C(=O)R$^3$.

In Formula (4), $L^3$ and $Y^3$ may be linked to each other to form a ring.

[$L^3$]

In Formula (4), $L^3$ represents a divalent group which is one selected from the third group consisting of an alkylene group, an alkenylene group, an alkynylene group, an arylene group, —O—, —NH—, —N($L^4$-$Y^4$)—, and —C(=O)— or a divalent group which is obtained by combining two or more selected from the third group.

$L^3$ is different from $L^2$ in Formula (3) in terms that $L^3$ does not represent a single bond.

Each of the alkylene group, the alkenylene group, and the alkynylene group as $L^3$ may be linear or may have a branched structure and/or a cyclic structure.

As the alkylene group, an alkylene group having 1 to 10 carbon atoms is preferable, an alkylene group having 1 to 4 carbon atoms is more preferable, and a methylene group or an ethylene group is still more preferable.

As the alkenylene group, an alkenylene group having 2 to 10 carbon atoms is preferable, an alkenylene group having 2 to 4 carbon atoms is more preferable, and an alkenylene group having 2 or 3 carbon atoms is still more preferable.

As the alkynylene group, an alkynylene group having 2 to 10 carbon atoms is preferable, an alkynylene group having 2 to 4 carbon atoms is more preferable, and an alkynylene group having 2 or 3 carbon atoms is still more preferable.

As the arylene group as $L^3$, an arylene group having 6 to 10 carbon atoms is preferable, a phenylene group or a naphthylene group is more preferable, and a phenylene group is still more preferable.

Each of the alkylene group, the alkenylene group, and the alkynylene group as $L^3$ may have a substituent. It is preferable that the substituent is at least one selected from the group consisting of a halogen atom, —OH, —OR$^3$, —NH$_2$, —NR$^3$H, —NR$^3$R$^4$, and —C(=O)R$^3$. $R^3$ and $R^4$ each independently represent an alkyl group, an alkenyl group, an alkynyl group, or an aryl group.

The arylene group as $L^3$ may have a substituent. It is preferable that the substituent is at least one selected from the group consisting of an alkyl group, an alkenyl group, an alkynyl group, an aryl group, a halogen atom, —OH, —OR$^3$, —NH$_2$, —NR$^3$H, —NR$^3$R$^4$, and —C(=O)R$^3$. $R^3$ and $R^4$ each independently represent an alkyl group, an alkenyl group, an alkynyl group, or an aryl group.

As "divalent group which is obtained by combining two or more selected from the second group" represented by $L^3$, a divalent group obtained by combining at least one of an alkylene group, an alkenylene group, an alkynylene group, or an arylene group and at least one of —O—, —NH—, —N($L^4$-$Y^4$)—, or —C(=O)— is preferable, and the following group (AO3) or the following group (BO1) is particularly preferable.

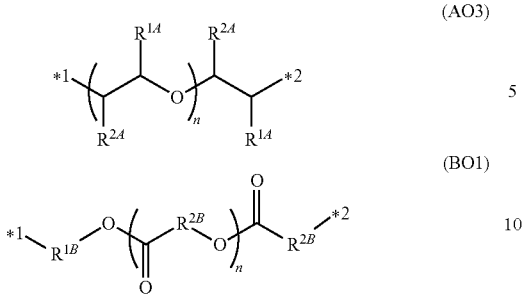

In the group (AO3), $R^{1A}$ and $R^{2A}$ each independently represent a hydrogen atom or a methyl group, n represents an integer of 1 to 10 (preferably an integer of 1 to 6 and more preferably an integer of 3 to 6), *1 represents a bonding position with respect to O (an oxygen atom), and *2 represents a bonding position with respect to $Y^3$.

It is preferable that in a case where one of $R^{1A}$ and $R^{2A}$ represents a methyl group, the other represents a hydrogen atom.

In the group (BO1), $R^{1B}$ and $R^{2B}$ each independently represent an alkyl group having 1 to 10 carbon atoms, n represents an integer of 1 to 10 (preferably an integer of 1 to 6 and more preferably an integer of 1 to 4), *1 represents a bonding position with respect to O (an oxygen atom), and *2 represents a bonding position with respect to $Y^3$.

$R^{1B}$ represents preferably an alkyl group having 1 to 6 carbon atoms and more preferably an alkyl group having 1 to 3 carbon atoms. $R^{2B}$ represents preferably an alkyl group having 2 to 8 carbon atoms and more preferably an alkyl group having 3 to 7 carbon atoms.

It is preferable that $L^3$ represents an alkylene group having 1 to 6 carbon atoms (more preferably 1 to 4 carbon atoms and still more preferably 1 or 2 carbon atoms), an alkylene group having 1 to 6 carbon atoms (more preferably 1 to 4 carbon atoms and still more preferably 1 or 2 carbon atoms) which has been substituted with a hydroxy group, a group (AO3), or a group (BO1).

[$Y^3$]

In Formula (4), $Y^3$ represents a halogen atom, —OH, —NH$_2$, —NR$^3$H, or —C(=O)R$^3$.

$Y^3$ in Formula (4) is different from $Y^2$ in Formula (3) in terms that $Y^3$ does not represent any of an alkyl group, an alkenyl group, an alkynyl group, an aryl group, —OR$^3$, or —NR$^3$R$^4$. $Y^3$ has the same definition as that for $Y^2$ in Formula (3) except for this point, and the preferable aspects thereof are the same as described above.

From the viewpoint of further improving the adhesiveness to the impermeable base material, it is preferable that $Y^3$ represents —OH, —NH$_2$, or —NR$^3$H.

—N(L$^4$-Y$^4$)— in Formula (4) has the same definition as that for —N(L$^4$-Y$^4$)— in Formula (3), and the preferred aspects thereof are also the same as described above.

$R^3$ and $R^4$ in Formula (4) each have the same definition as that for $R^3$ and $R^4$ in Formula (3), and the preferred aspects thereof are also the same as described above.

The number of carbon atoms of the structural unit represented by Formula (4) is preferably 30 or less, more preferably 27 or less, still more preferably 25 or less, and even still more preferably 23 or less. Further, the number of carbon atoms is preferably 3 or greater and more preferably 4 or greater.

Further, in Formula (4), it is also preferable that "-L$^3$-Y$^3$" represents any one of the group (4A) to the group (4I) shown below. In the group (4A) to the group (4I), * represents a bonding position.

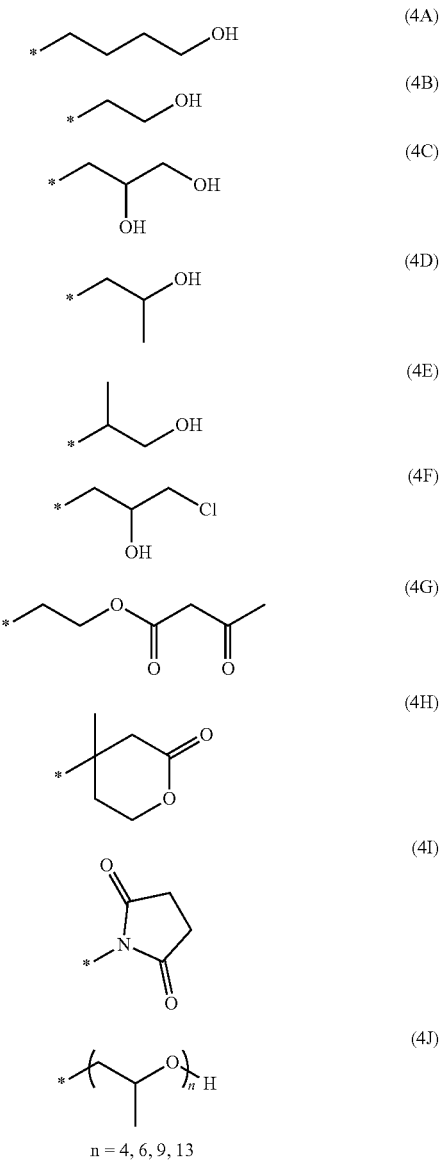

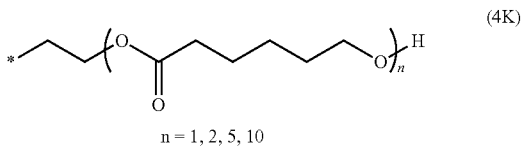

Hereinafter, specific examples of the structural unit represented by Formula (4) will be shown, but the structural unit represented by Formula (4) is not limited to the following specific examples.

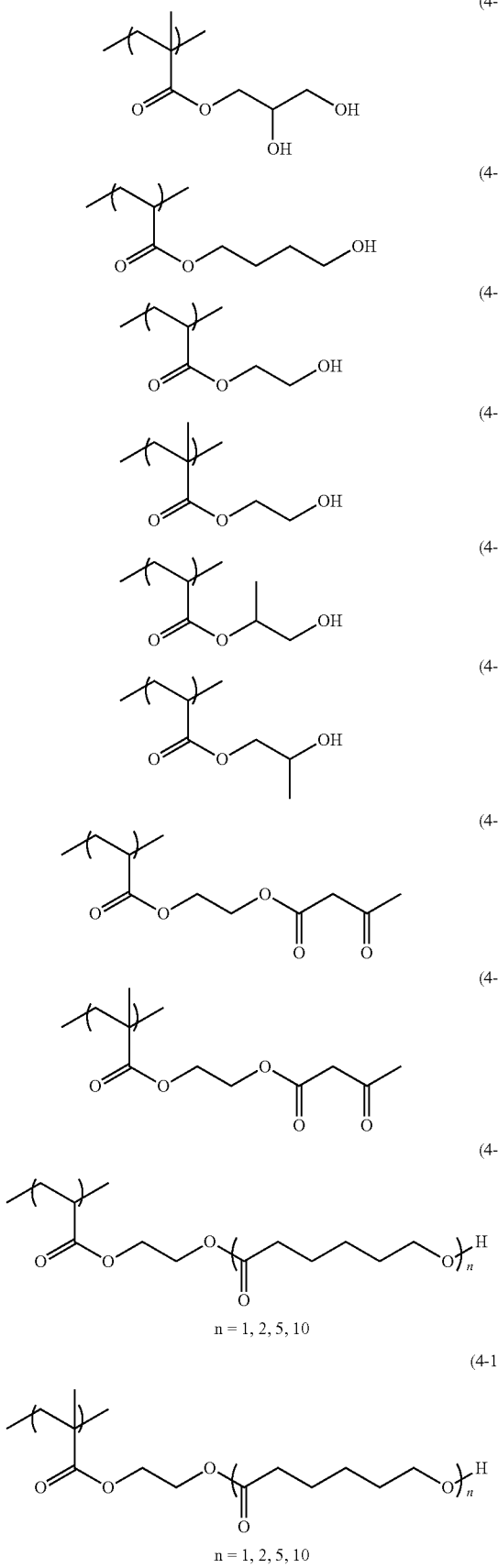
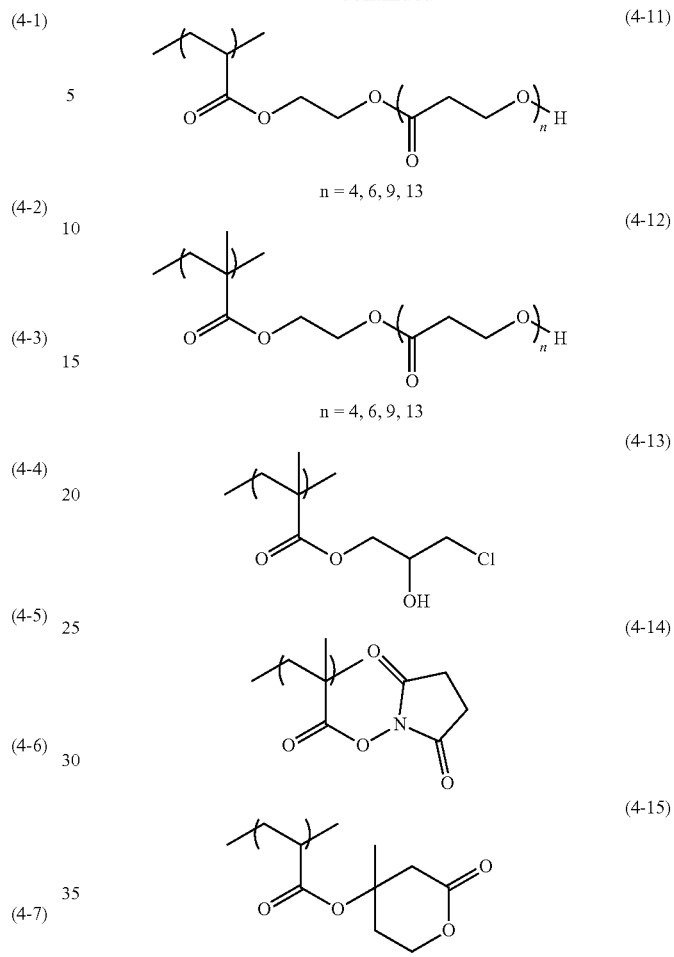

The anionic resin may have only one or two or more kinds of structural units derived from the hydrogen bonding group-containing monomer.

From the viewpoint of further improving the adhesiveness of the image to the impermeable base material and further spreading dots, the content of the structural unit derived from the hydrogen bonding group-containing monomer is preferably in a range of 5% by mass to 50% by mass, more preferably in a range of 5% by mass to 40% by mass, and still more preferably in a range of 10% by mass to 35% by mass with respect to the total mass of the anionic resin.

Further, from the viewpoint of further improving the adhesiveness of the image to the impermeable base material and further spreading dots, the total content of the structural unit represented by Formula (3) and the structural unit represented by Formula (4) is preferably in a range of 5% by mass to 50% by mass, more preferably in a range of 5% by mass to 40% by mass, and still more preferably in a range of 10% by mass to 35% by mass with respect to the total mass of the anionic resin.

(Structural Unit Derived from Hydrophobic Group-Containing Monomer)

In the present disclosure, it is preferable that the anionic resin has a structural unit derived from a monomer containing a hydrophobic group (hereinafter, simply referred to as "hydrophobic group-containing monomer"). Examples of the hydrophobic group include a chain aliphatic group, a cyclic aliphatic group, and an aromatic group.

From the viewpoint of further spreading dots, it is preferable that the structural unit derived from the hydrophobic group-containing monomer is at least one selected from the group consisting of structural units represented by Formulae (A) to (F).

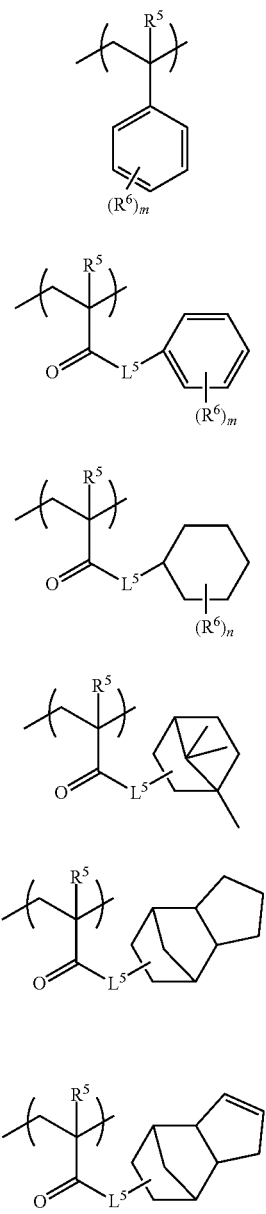

In Formulae (A) to (F), $R^5$'s each independently represent a hydrogen atom or a methyl group. $R^6$'s each independently represent an alkyl group, an alkenyl group, or an alkynyl group. m represents an integer of 0 to 5. n represents an integer of 0 to 11. $L^5$ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond.

[$R^6$]

In Formulae (A) to (F), $R^6$'s each independently represent an alkyl group, an alkenyl group, or an alkynyl group.

As the alkyl group, an alkyl group having 1 to 10 carbon atoms is preferable, an alkyl group having 1 to 4 carbon atoms is more preferable, and a methyl group or an ethyl group is still more preferable.

As the alkenyl group, an alkenyl group having 2 to 10 carbon atoms is preferable, an alkenyl group having 2 to 4 carbon atoms is more preferable, and an alkenyl group having 2 or 3 carbon atoms is still more preferable.

As the alkynyl group, an alkynyl group having 2 to 10 carbon atoms is preferable, an alkynyl group having 2 to 4 carbon atoms is more preferable, and an alkynyl group having 2 or 3 carbon atoms is still more preferable.

Further, $R^6$ may represent an unsubstituted group or a group substituted with a substituent. In a case where $R^6$ is substituted with a substituent, examples of the substituent include a halogen atom (such as a chlorine atom or a bromine atom) and an alkyl group (such as a methyl group or an ethyl group).

[m]

m in Formula (A) and Formula (B) denotes the number of substituents ($R^6$) for the benzene ring.

Further, m represents an integer of 0 to 5, preferably an integer of 0 to 3, more preferably an integer of 0 to 2, and still more preferably 0 or 1.

[n]

n in Formula (C) denotes the number of substituents ($R^6$) for the cyclohexane ring.

Further, n represents an integer of 0 to 11, preferably an integer of 0 to 6, more preferably an integer of 0 to 2, and still more preferably 0 or 1.

[$L^5$]

In Formulae (A) to (F), $L^5$ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond.

The alkylene group having 1 to 18 carbon atoms as $L^5$ may be linear or may have a branched structure and/or a cyclic structure.

The number of carbon atoms of the alkylene group having 1 to 18 carbon atoms as $L^5$ is preferably in a range of 1 to 12, more preferably in a range of 1 to 6, and still more preferably 1 or 2.

Examples of the arylene group having 6 to 18 carbon atoms include a phenylene group, a naphthylene group, and a tolyl group.

The number of carbon atoms of the arylene group having 6 to 18 carbon atoms as $L^5$ is preferably in a range of 6 to 12 and more preferably in a range of 6 to 10.

As "divalent group obtained by combining two or more selected from the fourth group" as $L^5$, a divalent group obtained by combining at least one of an alkylene group having 1 to 18 carbon atoms or an arylene group having 6 to 18 carbon atoms and at least one of —O—, —NH—, —S—, or —C(=O)— is preferable, and the following group (AO5) or the following group (AO6) is particularly preferable.

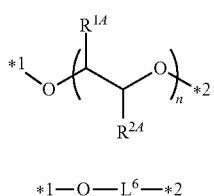
(AO5)

*1—O—L⁶—*2  (AO6)

In the group (AO5), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to a carbonyl carbon atom, and *2 represents a bonding position with respect to a non-carbonyl carbon atom.

It is preferable that in a case where one of $R^{1A}$ and $R^{2A}$ represents a methyl group, the other represents a hydrogen atom.

In the group (AO6), $L^6$ represents an alkylene group having 1 to 8 carbon atoms (preferably 1 to 4 carbon atoms and more preferably 1 or 2 carbon atoms), *1 represents a bonding position with respect to a carbonyl carbon atom, and *2 represents the bonding position with respect to a non-carbonyl carbon atom.

It is preferable that $L^5$ represents a single bond, —O—, the group (AO5), or the group (AO6).

Hereinafter, specific examples of the structural unit represented by Formula (A) will be shown, but the structural unit represented by Formula (A) is not limited to the following specific examples.

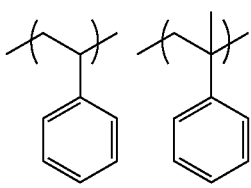

Hereinafter, specific examples of the structural unit represented by Formula (B) will be shown, but the structural unit represented by Formula (B) is not limited to the following specific examples.

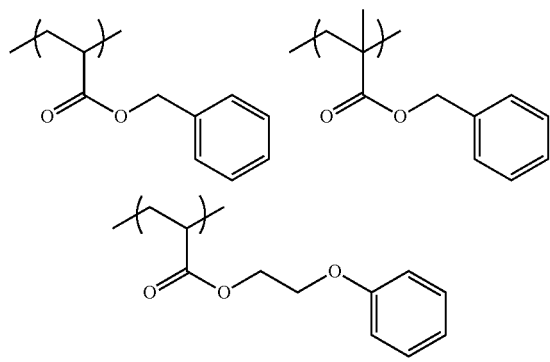

-continued

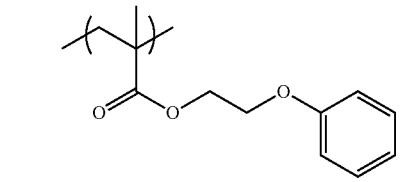

Hereinafter, specific examples of the structural unit represented by Formula (C) will be shown, but the structural unit represented by Formula (C) is not limited to the following specific examples.

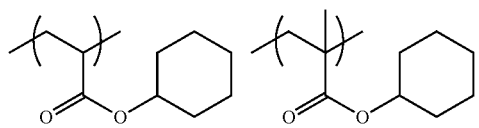

Hereinafter, specific examples of the structural unit represented by Formula (D) will be shown, but the structural unit represented by Formula (D) is not limited to the following specific examples.

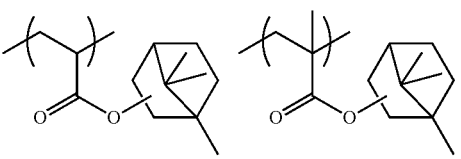

Hereinafter, specific examples of the structural unit represented by Formula (E) will be shown, but the structural unit represented by Formula (E) is not limited to the following specific examples.

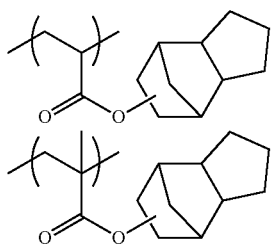

Hereinafter, specific examples of the structural unit represented by Formula (F) will be shown, but the structural unit represented by Formula (F) is not limited to the following specific examples.

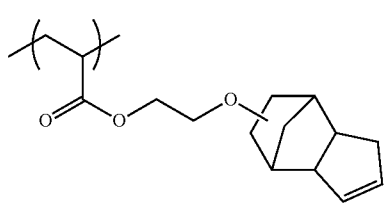

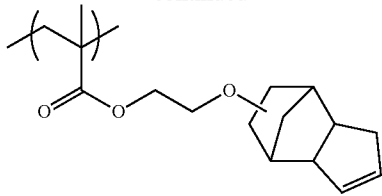

The anionic resin may contain only one or two or more kinds of structural units derived from the hydrophobic group-containing monomer.

From the viewpoint of further spreading dots, the content of the structural unit derived from the hydrophobic group-containing monomer is preferably 3% by mass or greater, more preferably in a range of 30% by mass to 90% by mass, still more preferably in a range of 40% by mass to 85% by mass, and particularly preferably in a range of 45% by mass to 75% by mass with respect to the total mass of the anionic resin.

Further, from the viewpoint of further spreading dots, the total content of the structural units represented by Formulae (A) to (F) is preferably 3% by mass or greater, more preferably in a range of 30% by mass to 90% by mass, still more preferably in a range of 40% by mass to 85% by mass, and particularly preferably in a range of 45% by mass to 75% by mass with respect to the total mass of the anionic resin.

(Other Structural Units)

In the present disclosure, the anionic resin may have other structural units in addition to the structural unit derived from the above-described anionic group-containing monomer, the structural unit derived from the hydrogen bonding group-containing monomer, and the structural unit derived from the hydrophobic group-containing monomer.

Examples of other structural units include a structural unit derived from (meth)acrylate containing a chain alkyl group (that is, a linear or branched chain alkyl group).

Specific examples of other structural units are shown below, but other structural units are not limited to the following specific examples.

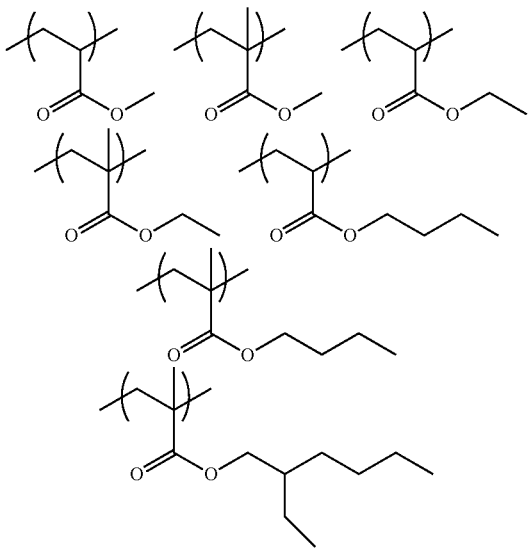

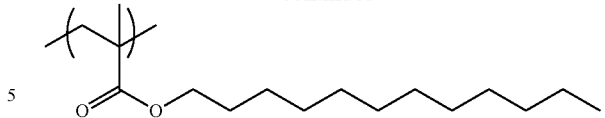

In the present disclosure, the content of the structural unit derived from the alkyl (meth)acrylate containing a chain alkyl group having 2 or more carbon atoms is preferably less than 5% by mass, more preferably 4% by mass or less, and still more preferably 3% by mass or less with respect to the total mass of the anionic resin. The content of the structural unit derived from the alkyl (meth)acrylate containing a chain alkyl group having 2 or more carbon atoms may be 0% by mass. That is, the anionic resin may not have the structural unit derived from the alkyl (meth)acrylate containing a chain alkyl group having 2 or more carbon atoms.

In the specific examples described above, the structural unit derived from methyl (meth)acrylate does not correspond to the structural unit derived from alkyl (meth)acrylate containing a chain alkyl group having 2 or more carbon atoms.

In a case where the content of the structural unit derived from the alkyl (meth)acrylate containing a chain alkyl group having 2 or more carbon atoms is less than 5% by mass with respect to the total mass of the anionic resin, the anionic resin is unlikely to be exposed to the air interface, the ink droplets landed on the surface of the impermeable base material onto which the pretreatment liquid has been applied spread, and the spread dots are formed.

The weight-average molecular weight (Mw) of the anionic resin is preferably in a range of 3,000 to 2,000,000, more preferably in a range of 10,000 to 1,500,000, still more preferably in a range of 10,000 to 1,000,000, and particularly preferably in a range of 30,000 to 200,000.

In a case where the weight-average molecular weight of the anionic resin is 3,000 or greater, the adhesiveness of the image to the impermeable base material is further improved. Further, in a case where the weight-average molecular weight of the anionic resin is 2,000,000 or less, the anionic dispersion stability is further improved.

In the present disclosure, the weight-average molecular weight (Mw) indicates a value measured by gel permeation chromatography (GPC) unless otherwise specified. The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 mL/min, a sample injection volume of 10 μl, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The Anionic Resin May be a Water-Insoluble Resin.

In the present disclosure, the term "water-insoluble" in a water-insoluble resin indicates a property that the amount of a substance to be dissolved in 100 g of water at 25° C. is less than 1.0 g (more preferably less than 0.5 g).

In a case where the anionic resin is a water-insoluble resin, the anionic resin is present in the pretreatment liquid in the form of resin particles.

In a case where the anionic resin is present in the form of resin particles, the volume average particle diameter of the resin particles is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering type particle size distribution analyzer. As a measuring device, a particle size distribution measuring device "MICROTRAC MT-3300II" (manufactured by Nikkiso Co., Ltd.) is exemplified.

In regard to the specific resin particles, the description in paragraphs 0137 to 0171 of WO2017/163738A and the description of paragraphs 0036 to 0081 of JP2010-077218A may be referred to.

The pretreatment liquid of the present disclosure may contain only one or two or more kinds of anionic resins.

The content of the anionic resin in the pretreatment liquid of the present disclosure is preferably in a range of 1% by mass to 25% by mass, more preferably in a range of 2% by mass to 20% by mass, still more preferably in a range of 3% by mass to 15% by mass, and particularly preferably in a range of 5% by mass to 15% by mass with respect to the total mass of the pretreatment liquid.

In a case where the content of the anionic resin is 1% by mass or greater, the adhesiveness of the image to the impermeable base material is further improved. In a case where the content of the anionic resin is 25% by mass or less, the viscosity of the pretreatment liquid is further reduced, and the imparting property of the pretreatment liquid is further improved.

The glass transition temperature of the anionic resin is preferably −30° C. or higher and lower than 100° C., more preferably −30° C. or higher and lower than 60° C., and still more preferably −20° C. or higher and lower than 40° C.

In a case where the glass transition temperature of the anionic resin is −30° C. or higher and lower than 100° C., the film hardness of the image is improved, and the adhesiveness of the image to the permeable base material is improved. Further, in a case where the glass transition temperature of the anionic resin is −30° C. or higher, the dispersion stability of the anionic resin in the pretreatment liquid is high, and thus the storage stability of the pretreatment liquid is further improved.

In the present disclosure, the glass transition temperature (hereinafter, also referred to as "Tg") of the anionic resin denotes the extrapolated glass transition initiation temperature (hereinafter, also referred to as "Tig") which is measured in conformity with the method described in JIS K 7121 (1987) or JIS K 6240 (2011) using differential scanning calorimetry (DSC).

The method of measuring the Tg in the present disclosure will be described in more detail.

First, the specific resin is maintained at a temperature lower than the expected Tg of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created. The temperature of the intersection of a straight line obtained by extending the base line on a low temperature side in the DTA curve or the DSC curve onto a high temperature side and a tangent drawn at a point where the gradient of a curve from a step-like change portion of the glass transition is maximized is defined as Tg.

Further, in a case where the pretreatment liquid contains two or more kinds of anionic resins, the weighted average value obtained by weighting and averaging the glass transition temperatures of individual anionic resins contained in the pretreatment liquid according to the mass fractions of the individual anionic resins is defined as the glass transition temperature (Tg) of the anionic resin contained in the pretreatment liquid.

<Surfactant>

The pretreatment liquid of the present disclosure may contain a surfactant.

The surfactant can be used as a surface tension adjuster or an antifoaming agent. Examples of the surfactant include a nonionic surfactant, a cationic surfactant, an anionic surfactant, and a betaine surfactant. Among these, from the viewpoint of the aggregation rate of the ink, a nonionic surfactant or an anionic surfactant is preferable as the surfactant.

Examples of the surfactant include compounds exemplified as surfactants in pp. 37 and 38 of JP1984-157636A (JP-S59-157636A) and Research Disclosure No. 308119 (1989). Further, the surfactant may be a fluorine-based surfactant or a silicone-based surfactant described in JP2003-322926A, JP2004-325707A, and JP2004-309806A.

The pretreatment liquid of the present disclosure may contain only one or two or more kinds of surfactants.

For example, in a case where the pretreatment liquid contains a surfactant as an antifoaming agent, the content of the surfactant is preferably in a range of 0.0001% by mass to 1% by mass and more preferably in a range of 0.001% by mass to 0.3% by mass with respect to the total mass of the pretreatment liquid.

<Aggregating Agent>

It is preferable that the pretreatment liquid of the present disclosure contains an aggregating agent. That is, it is preferable that the pretreatment liquid of the present disclosure contains an anionic resin, an aqueous medium, and an aggregating agent, the C log P value of the anionic resin is 1.40 or greater, and the content of the structural unit derived from the alkyl (meth)acrylate containing a chain alkyl group having 2 or more carbon atoms in the anionic resin is less than 5% by mass with respect to the total mass of the anionic resin. The aggregating agent is a component for aggregating components (for example, a colorant) in the ink used for image recording.

The aggregating agent contains preferably at least one selected from the group consisting of a polyvalent metal compound, an organic acid, and a metal complex and more preferably an organic acid.

—Polyvalent Metal Compound—

Examples of the polyvalent metal compound include salts of alkaline earth metals of a group 2 (such as magnesium and calcium) in the periodic table, transition metals of a group 3 (such as lanthanum) in the periodic table, metals of a group 13 (such as aluminum) in the periodic table, and lanthanides (such as neodymium).

As salts of these metals, salts of organic acids, a nitrate, a chloride, and a thiocyanate described below are preferable.

Among these, preferred examples of the polyvalent metal compound include a calcium salt or magnesium salt of an organic acid (such as formic acid, acetic acid, or a benzoic acid), a calcium salt or magnesium salt of nitric acid, calcium chloride, magnesium chloride, and a calcium salt or magnesium salt of thiocyanic acid.

Further, it is preferable that at least a part of the polyvalent metal compound is dissociated into polyvalent metal ions and counterions in the pretreatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

Among these, from the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Examples of the organic compound containing a carboxy group include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, and nicotinic acid.

Among these, from the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

Specifically, as the polyvalent carboxylic acid, malonic acid, malic acid, maleic acid, succinic acid, glutaric acid, pimelic acid, adipic acid, fumaric acid, tartaric acid, 4-methylphthalic acid, or citric acid is preferable, and malonic acid, malic acid, tartaric acid, succinic acid, glutaric acid, pimelic acid, adipic acid, or citric acid is more preferable.

It is preferable that the organic acid has a low pKa (for example, 1.0 to 5.0).

In this manner, the surface charge of particles such as resin particles or the pigment stably dispersed in the ink by a weakly acidic functional group such as a carboxy group can be reduced by bringing the ink into contact with an organic acid having a lower pKa to degrade the dispersion stability.

It is preferable that the organic acid has a low pKa, high solubility in water, and a valence of divalent or higher. Further, it is more preferable that the organic acid has a high buffer capacity in a pH region with a pKa lower than the pKa of a functional group (for example, a carboxy group) that stably disperses particles in the ink.

—Metal Complex—

It is preferable that the metal complex contains at least one selected from the group consisting of zirconium, aluminum, and titanium as a metal element.

As the metal complex, a metal complex including at least one selected from the group consisting of acetate, acetylacetonate, methylacetoacetate, ethylacetoacetate, octylene glycolate, butoxyacetylacetonate, lactate, a lactate ammonium salt, and triethanol aminate as a ligand is preferable.

The metal complex may be a commercially available product. Further, various organic ligands, particularly various multidentate ligands that are capable of forming metal chelate catalysts are commercially available. Accordingly, the metal complex may be a metal complex prepared by combining a commercially available organic ligand with a metal.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributory monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable as the metal complex.

The pretreatment liquid of the present disclosure may contain only one or two or more kinds of aggregating agents.

In a case where the pretreatment liquid of the present disclosure contains an aggregating agent, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total mass of the pretreatment liquid.

<Other Components>

The pretreatment liquid may contain other components as necessary in addition to the above-described components.

Examples of other components that may be contained in the pretreatment liquid include known additives such as a solid wetting agent, colloidal silica, an inorganic salt, a discoloration inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound (for example, water-soluble polymer compounds described in paragraphs 0026 to 0080 of JP2013-001854A).

—Physical Properties of Pretreatment Liquid—

The pH of the pretreatment liquid is preferably 0.1 to 4.5, more preferably 0.2 to 4.0, from the viewpoint of the aggregation rate of the ink. The pH is a value measured at 25° C. using a commercially available pH meter.

In a case where the pH of the pretreatment liquid is 0.1 or greater, the roughness of the impermeable base material is further decreased and the adhesiveness of the image area is further improved. In a case where the pH of the pretreatment liquid is 4.0 or less, the aggregation rate is further improved, coalescence of dots on the surface of the impermeable base material is further suppressed, and the roughness of the image is further decreased.

From the viewpoint of the aggregation rate of the ink, the viscosity of the pretreatment liquid is preferably in a range of 0.5 mPa·s to 10 mPa·s and more preferably in a range of 1 mPa·s to 5 mPa·s. The viscosity is a value measured at 25° C. using a viscometer. The viscometer is measured using, for example, a VISCOMETER TV-22 type viscometer (manufactured by Toki Sangyo Co., Ltd.).

The surface tension of the pretreatment liquid is preferably 60 mN/m or less, more preferably in a range of 20 mN/m to 50 mN/m, and still more preferably in a range of 30 mN/m to 45 mN/m. The surface tension is a value measured at a temperature of 25° C. The surface tension is measured using, for example, an Automatic Surface Tentiometer CBVP-Z (manufactured by Kyowa Interface Science Co., Ltd.).

[Ink Set]

An ink set of the present disclosure comprises the above-described pretreatment liquid of the present disclosure and an ink containing water and a colorant.

According to the ink set of the present disclosure, an image can be recorded by applying the pretreatment liquid onto the impermeable base material and applying the ink onto the surface of the impermeable base material onto which the pretreatment liquid has been applied. Therefore, according to the ink set of the present disclosure, an image with excellent adhesiveness to an impermeable base material can be recorded.

The ink set of the present disclosure may comprise only one or two or more kinds of inks. The ink set of the present disclosure may comprise only one or two or more kinds of pretreatment liquids.

As a preferred embodiment of the ink set according to the present disclosure, an embodiment of the ink set comprising two or more kinds of inks and one or more kinds of pretreatment liquids is exemplified.

According to such an embodiment, a multicolor image can be recorded.

Examples of two or more kinds of inks include three kinds of inks consisting of a cyan ink, a magenta ink, and a yellow ink, four kinds of inks consisting of a cyan ink, a magenta ink, a yellow ink, and a black ink, four or more kinds of inks consisting of the above-described three kinds of colored inks and at least one selected from the group consisting of a white ink, a green ink, an orange ink, a violet ink, a light cyan ink, a light magenta ink, and a light yellow ink, and five or more kinds of inks consisting of the above-described four kinds of colored inks and at least one selected from the group consisting of a white ink, a green ink, an orange ink, a violet ink, a light cyan ink, a light magenta ink, and a light yellow ink.

However, two or more kinds of inks are not limited to these specific examples.

<Ink>

The ink in the ink set of the present disclosure contains a colorant and water. It is preferable that the ink is an aqueous ink. The aqueous ink denotes an ink having a water content of 50% by mass or greater with respect to the total mass amount of the ink.

Further, the content of the organic solvent in the ink is preferably 40% by mass or less and more preferably 30% by mass or less with respect to the total mass of the ink.

Further, the content of the polymerizable compound (such as a cationic polymerizable compound or a radically polymerizable compound) in the ink is preferably 10% by mass or less with respect to the total mass of the ink.

(Colorant)

An organic pigment or an inorganic pigment is preferable as the colorant.

Examples of the organic pigment include an azo pigment, a polycyclic pigment, a chelate dye, a nitro pigment, a nitroso pigment, and aniline black. Among these, an azo pigment or a polycyclic pigment is more preferable as the pigment.

Examples of the inorganic pigment include titanium oxide, iron oxide, calcium carbonate, barium sulfate, aluminum hydroxide, barium yellow, cadmium red, chrome yellow, and carbon black.

The colorant may be the colorant described in paragraphs 0096 to 0100 of JP2009-241586A.

The ink may contain only one or two or more kinds of colorants.

The content of the colorant is preferably in a range of 1% by mass to 25% by mass, more preferably in a range of 2% by mass to 20% by mass, still more preferably in a range of 2% by mass to 15% by mass, and particularly preferably in a range of 2% by mass to 12% by mass with respect to the total mass of the ink.

(Water)

The ink contains water.

The content of water is preferably 50% by mass or greater and more preferably 60% by mass or greater with respect to the total mass of the ink. The upper limit of the content of water depends on the amount of other components such as a colorant, but is, for example, 90% by mass, preferably 85% by mass, and more preferably 80% by mass.

(Dispersant)

The ink may contain at least one dispersant used for dispersing the colorant.

As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing ratio between the colorant and the dispersant is preferably in a range of 1:0.06 to 1:3, more preferably in a range of 1:0.125 to 1:2, and still more preferably in a range of 1:0.125 to 1:1.5 in terms of the mass.

(Resin Particles)

It is preferable that the ink contains at least one kind of resin particles. In a case where the ink contains resin particles, the fixing property of the ink to the impermeable base material and the rub resistance of the image can be further improved.

It is preferable that the resin particles are dispersed in water and an aqueous medium. Preferred examples of the resin particles include resin particles described in paragraphs 0062 to 0076 of JP2016-188345A.

(Water-Soluble Organic Solvent)

It is preferable that the ink contains at least one water-soluble organic solvent.

In a case where the ink contains a water-soluble organic solvent, the jettability of the ink from an ink jet head is further improved.

Examples of the water-soluble organic solvent include alcohols (such as methanol, ethanol, propanol, isopropanol, n-butanol, isobutanol, sec-butanol, t-butanol, pentanol, hexanol, cyclohexanol, and benzyl alcohol); polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 2-methyl-1,3-propanediol, 1,2,6-hexanetriol, an acetylene glycol derivative, glycerin, and trimethylolpropane); glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether); amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine); and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

(Other Additives)

The ink may contain components other than the components described above. Examples of other components include a discoloration inhibitor, an emulsification stabilizer, a penetration enhancer, an ultraviolet absorbing agent, a preservative, a fungicide, a pH adjuster, a surface tension adjuster, an antifoaming agent, a viscosity adjuster, a dispersant in addition to those described above, a dispersion stabilizer, a rust inhibitor, and a chelating agent.

[Base Material for Image Recording]

A base material for image recording of the present disclosure includes an impermeable base material and a pretreatment layer which is provided on at least one surface of the impermeable base material and contains the solid content of the pretreatment liquid of the present disclosure. Here, the solid content of the pretreatment liquid indicates all the components obtained by excluding the solvent component (at least the aqueous medium) in the pretreatment liquid. That is, the solid content of the pretreatment liquid contains at least an anionic resin having a C log P value of 1.40 or greater.

An image where spread dots are formed can be recorded by applying the ink onto the pretreatment layer in the base material for image recording of the present disclosure to record an image.

The base material for image recording of the present disclosure can be suitably produced by, for example, the following method of producing the base material for image recording.

[Method of Producing Base Material for Image Recording]

As the method of producing the base material for image recording of the present disclosure, a production method including a step of applying the above-described pretreatment liquid of the present disclosure onto the impermeable base material (hereinafter, also referred to as "pretreatment liquid application step") is exemplified. The method of producing the base material for image recording of the present disclosure may include other steps in addition to the pretreatment liquid application step as necessary.

<Pretreatment Liquid Application Step>

The application of the pretreatment liquid in the pretreatment liquid application step can be performed by employing a known application method such as a coating method, an ink jet recording method, or a dipping method.

Examples of the coating method include known coating methods using a bar coater, an extrusion die coater, an air doctor coater, a blade coater, a rod coater, a knife coater, a squeeze coater, and a reverse roll coater.

The details of the ink jet recording method are the same as the details of the ink jet recording method in the image recording method described below.

The amount of the pretreatment liquid to be applied is not particularly limited as long as the ink can be aggregated, but the amount of the pretreatment liquid to be applied after being dried is set to be preferably 0.05 g/m$^2$ or greater and more preferably in a range of 0.05 g/m$^2$ to 1.0 g/m$^2$ from the viewpoints of enhancing the adhesiveness of the image and suppressing peeling of the image.

Further, the impermeable base material may be heated before the application of the pretreatment liquid. The heating temperature may be appropriately set according to the kind of the impermeable base material and the composition of the pretreatment liquid, but the temperature of the impermeable base material is set to be preferably in a range of 30° C. to 70° C. and more preferably in a range of 30° C. to 60° C.

The impermeable base material may be an impermeable base material that has been subjected to a surface treatment in advance. Further, the specific examples of the surface treatment that may be performed on the impermeable base material before the application of the pretreatment liquid in the pretreatment liquid application step using the impermeable base material that has not been subjected to a surface treatment are as described above.

In the pretreatment liquid application step, the pretreatment liquid applied onto the impermeable base material may be heated and dried. Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied; a method of applying warm air or hot air to the surface of the impermeable base material onto which the pretreatment liquid has been applied; a method of applying heat using an infrared heater from the surface of the impermeable base material onto which the pretreatment liquid has been applied or from a side of the impermeable base material opposite to the surface onto which the pretreatment liquid has been applied; and a method of combining a plurality of these methods.

The heating temperature of heating and drying the pretreatment liquid is preferably 35° C. or higher and more preferably 40° C. or higher. The upper limit of the heating temperature is not particularly limited, but is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and still more preferably in a range of 0.5 seconds to 10 seconds.

[Image Recorded Material]

An image recorded material of the present disclosure includes an impermeable base material and an image that includes a pretreatment layer provided on at least one surface of the impermeable base material and containing the solid content (for example, the anionic resin having a C log P value of 1.40 or greater) in the pretreatment liquid of the present disclosure and a colorant.

Since the image recorded material of the present disclosure includes an image containing an anionic resin having a C log P value of 1.40 or greater, a widely spread dot diameter can be formed.

The image recorded material of the present disclosure can be suitably produced by, for example, the image recording method described below.

[Image Recording Method]

As an example of an image recording method of the present invention, an image recording method including a step of applying the pretreatment liquid of the present disclosure onto an impermeable base material (pretreatment liquid application step) and a step of applying an ink containing a colorant and water onto the surface of the impermeable base material onto which the pretreatment liquid has been applied using an ink jet recording method to record an image (image recording step).

The image recording method of the present disclosure may include other steps in addition to the pretreatment liquid application step and the image recording step as necessary.

The preferable aspect of the pretreatment liquid application step is the same as the preferable aspect of "pretreatment liquid application step" in the above-described example of the method of producing the base material for image recording.

<Image Recording Step>

The image recording step is a step of applying an ink containing a colorant and water onto the surface of the impermeable base material onto which the pretreatment liquid has been applied using an ink jet recording method to record an image.

The method of jetting the ink in the ink jet recording method is not particularly limited, and any of known methods such as an electric charge control method of jetting an ink using an electrostatic attraction force, a drop-on-demand method (pressure pulse method) using a vibration pressure of a piezoelectric element, an acoustic ink jet recording method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the ink jet recording method, particularly, an ink jet recording method, described in JP1979-59936A (JP-S54-59936A), of jetting an ink from a nozzle using an action force caused by a rapid change in volume of the ink after being subjected to an action of thermal energy can be effectively used. Further, as the ink jet recording method, the method described in paragraphs 0093 to 0105 of JP2003-306623A can also be employed.

The application of the ink onto the impermeable base material using the ink jet recording method can be performed by allowing the ink to be jetted from a nozzle of an ink jet head.

Examples of the system of the ink jet head include a shuttle system of performing recording while scanning a short serial head in the width direction of a recorded medium and a line system of using a line head in which recording elements are aligned in correspondence with the entire area of one side of a recorded medium.

In the line system, image recording can be performed on the entire surface of the recorded medium by scanning the recorded medium in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable that the application of the ink is performed using an ink jet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pico liter (pL) to 10 pL and more preferably in a range of 1.5 pL to 6 pL. Further, from the viewpoints of improving the image unevenness and improving connection of continuous gradations, it is also effective that the ink is jetted by combining different liquid droplet amounts.

In the image recording step, an image may be obtained by heating and drying the ink which has been applied onto the impermeable base material.

Examples of the means for heating and drying the ink include known heating means such as a heater, known air blowing means such as a dryer, and means for combining these.

Examples of the method of heating and drying the ink include a method of applying heat using a heater or the like from a side of the impermeable base material opposite to the surface onto which the ink has been applied; a method of applying warm air or hot air to the surface of the impermeable base material onto which the ink has been applied; a method of applying heat using an infrared heater from the surface of the impermeable base material onto which the ink has been applied or from a side of the impermeable base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, but is, for example, 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, the impermeable base material may be heated in advance before the application of the ink.

The heating temperature may be appropriately set, but the temperature of the impermeable base material is set to be preferably in a range of 20° C. to 50° C. and more preferably in a range of 25° C. to 40° C.

In the image recording step, inks of two or more colors may be applied onto the surface of the impermeable base material onto which the pretreatment liquid has been applied, and images of two or more colors may be recorded.

EXAMPLES

Hereinafter, examples of the present disclosure will be described below, but the present disclosure is not limited to the following examples.

Further, "%" indicates % by mass unless otherwise specified.

Synthesis of Resin 1 Used in Pretreatment Liquid of Example 1

7.5 g of sodium dodecyl benzene sulfonate (product name, "NEOPELEX G-15", 16 mass % aqueous solution, manufactured by Kao Corporation) and 303.2 g of water were added to a 1,000 mL three-neck flask provided with a stiffer and a cooling pipe, and the solution was heated to 85° C. in a nitrogen atmosphere. A solution A obtained by dissolving 11.0 g of sulfopropyl methacrylate (manufactured by Tokyo Chemical Industry Co., Ltd.) in 40 g of water, a solution B obtained by mixing 25 g of 4-hydroxybutyl acrylate ("HBA" in the table, manufactured by FUJIFILM Wako Pure Chemical Corporation), 44 g of isobornyl methacrylate ("IBOMA" in the table, manufactured by FUJIFILM Wako Pure Chemical Corporation), and 20 g of styrene ("St" in the table, manufactured by FUJIFILM Wako Pure Chemical Corporation), and a solution C obtained by dissolving 1.8 g of sodium persulfate (manufactured by FUJIFILM Wako Pure Chemical Corporation) in 50 g of water were simultaneously added dropwise to the heated mixed solution in the three-neck flask for 3 hours. After completion of the dropwise addition, the resulting solution was allowed to further react for 3 hours, thereby synthesizing 500 g of an aqueous dispersion liquid of the resin 1 (amount of solid content: 20.1% by mass). The glass transition temperature of the synthesized resin 1 was 70° C. Further, the weight-average molecular weight of the resin 1 was 110,000.

Synthesis of Resins Used in Pretreatment Liquids of Examples 2 to 28 and Comparative Examples 1 to 5

Resins used in the pretreatment liquids of Examples 2 to 28 and Comparative Examples 1 to 5 were synthesized by the same method as the method for the synthesis of the resin 1 except that the kind and the amount of monomer used as the raw material were changed to the kind and the amount as listed in Table 1.

The monomers used for the synthesis of resins and the C log P values of respective monomers are as follows.

(Hydrophobic group-containing monomer)

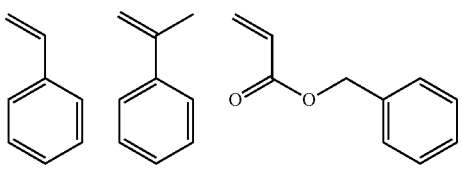

St
CLogP: 2.866

αMe-St
CLogP: 3.265

BzA
CLogP: 2.565

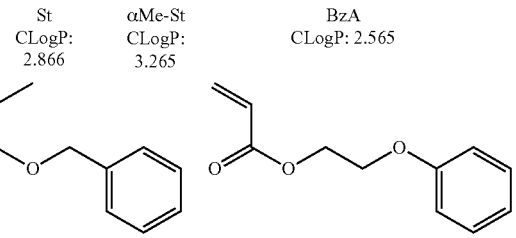

BzMA
CLogP: 2.874

PEA
CLogP: 2.564

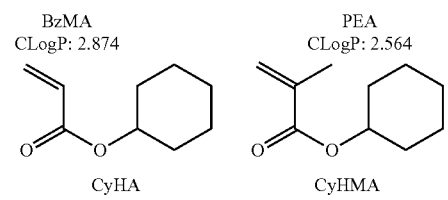

CyHA
CLogP: 2.828

CyHMA
CLogP: 3.137

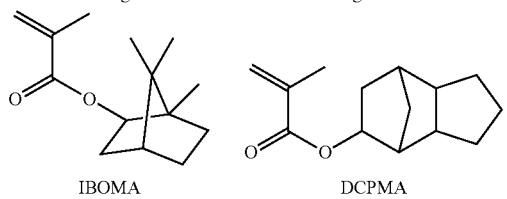

IBOMA
CLogP: 4.969

DCPMA
CLogP: 4.285

(Hydrogen bonding group-containing monomer)

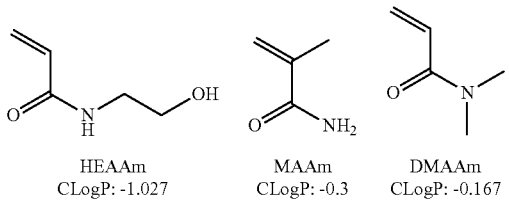

HEAAm
CLogP: -1.027

MAAm
CLogP: -0.3

DMAAm
CLogP: -0.167

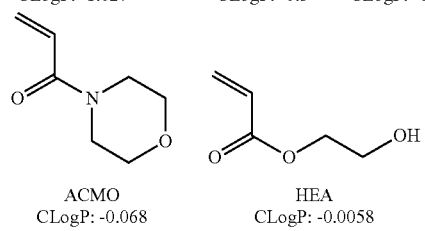

ACMO
CLogP: -0.068

HEA
CLogP: -0.0058

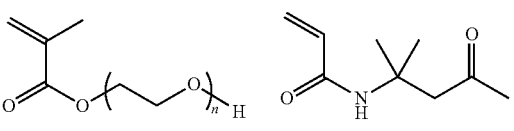

PEGMA
n = 4 CLogP: 0.0164
n = 25 CLogP: -3.6712

DAAm
CLogP: 0.289

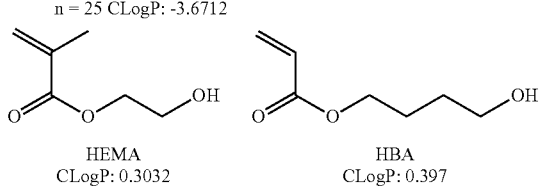

HEMA
CLogP: 0.3032

HBA
CLogP: 0.397

-continued

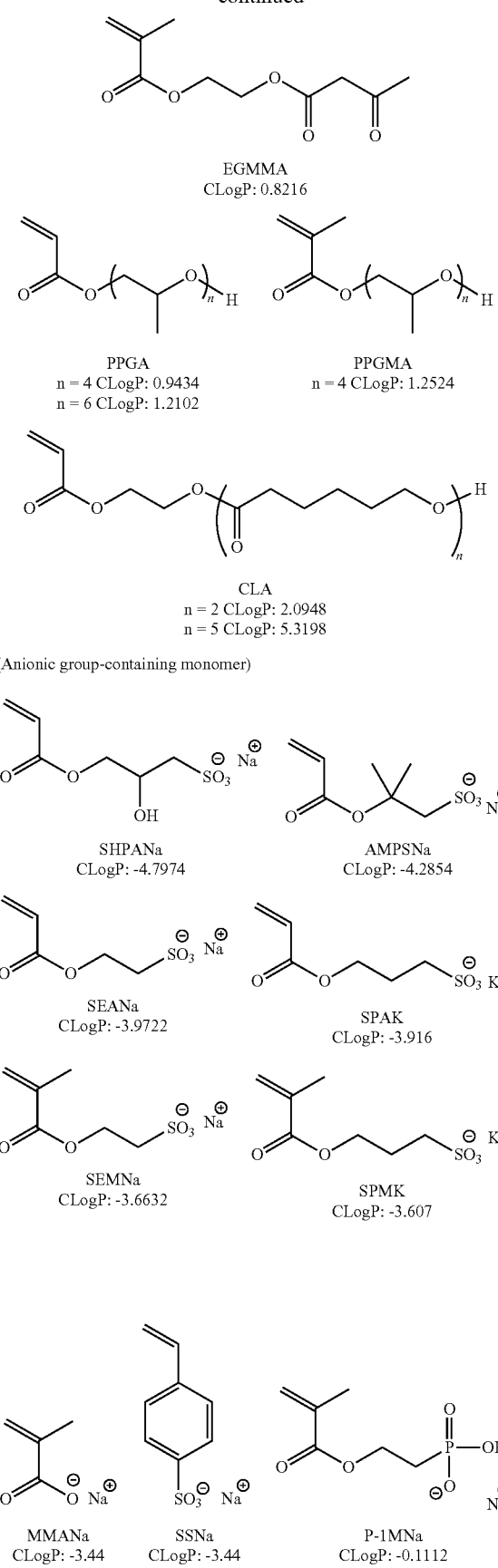

(Anionic group-containing monomer)

-continued (Other Monomers)

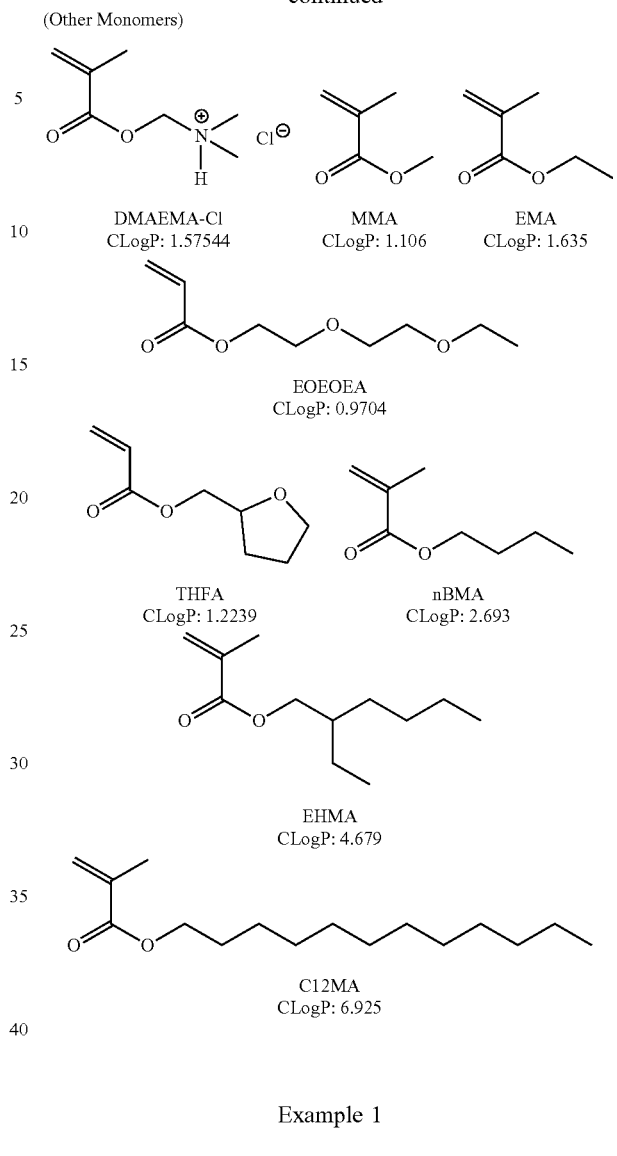

Example 1

<Preparation of Pretreatment Liquid>

Respective components described in the "composition of pretreatment liquid" below were mixed to prepare a pretreatment liquid.

—Composition of Pretreatment Liquid—

Aqueous dispersion liquid of resin 1:10.0% by mass as amount of resin 1.

Water-soluble organic solvent (propylene glycol): 5.0% by mass

Aggregating agent (malonic acid): 5.0% by mass

Antifoaming agent (product name, "TSA-739", manufactured by Momentive Performance Materials Japan LLC, concentration of solid contents: 15% by mass; emulsion type silicone antifoaming agent): 0.01% by mass as amount of antifoaming agent Ion exchange water: remaining amount set such that total amount was 100% by mass <Preparation of Ink>

Further, respective components described in the section of "ink composition" below were mixed to prepare a cyan ink.

—Ink Composition—
- Cyan pigment dispersion liquid (product name: "Projet Cyan APD 1000", manufactured by FUJIFILM Imaging Colorants Ltd., concentration of pigment: 12% by mass): 20% by mass
- Polymer particle aqueous dispersion liquid shown below: 8% by mass
- Water-soluble organic solvent (propylene glycol): 20.0% by mass
- Surfactant (product name, "OLFINE E1010", manufactured by Nissin Chemical Co., Ltd.): 1.0% by mass
- Ion exchange water: remaining amount set such that total amount was 100% by mass —Preparation of Polymer Particle Aqueous Dispersion Liquid—

A polymer particle aqueous dispersion liquid was prepared in the following manner.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution consisting of 220.4 g of methyl methacrylate, 301.6 g of isobornyl methacrylate, 58.0 g of methacrylic acid, 108 g of methyl ethyl ketone, and 2.32 g of dimethyl 2,2'-azobis(2-methyl propionate) (product name, "V-601", manufactured by FUJIFILM Wako Pure Chemical Corporation) as a polymerization initiator was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour. The operation of the following step (1) was performed on the stirred solution.

Step (1): A solution consisting of 1.16 g of "V-601" and 6.4 g of methyl ethyl ketone was added to the solution, and the resulting solution was stirred for 2 hours.

Subsequently, the operation of the above-described step (1) was repeated four times. A solution formed of 1.16 g of "V-601" and 6.4 g of methyl ethyl ketone was added to the solution, and the resulting solution was continuously stirred for 3 hours.

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0% by mass) containing a copolymer of methyl methacrylate, isobornyl methacrylate, and methacrylic acid (=38/52/10 [mass ratio]). The weight-average molecular weight (Mw) of the copolymer was 63,000, and the acid value thereof was 65.1 mgKOH/g.

Next, 317.3 g (concentration of solid contents: 41.0% by mass) of the obtained polymerization solution was weighed, 46.4 g of isopropanol, 1.65 g of a 20 mass % maleic acid anhydride aqueous solution (corresponding to 0.3% by mass as maleic acid with respect to the copolymer), and 40.77 g of a 2 mol/L sodium hydroxide aqueous solution were added to the solution, and the temperature of the liquid in the reaction container was increased to 70° C.

Next, 380 g of distilled water was added dropwise to the solution, which had been heated to 70° C., at a speed of 10 mL/min, and water dispersion was performed.

Thereafter, a total amount of 287.0 g of isopropanol, methyl ethyl ketone, and distilled water was distilled off by maintaining the temperature of the liquid in the reaction container at 70° C. for 1.5 hours under reduced pressure. 0.278 g (440 ppm as benzisothiazolin-3-one with respect to solid content of polymer) of PROXEL GXL (S) (manufactured by Arch Chemicals, Inc.) was added to the obtained liquid.

The obtained liquid was filtered using a filter having a mesh diameter of 1 µm, and the filtrate was collected, thereby obtaining an aqueous dispersion liquid of polymer particles whose concentration of solid contents was 26.5% by mass.

Examples 2 to 28 and Comparative Examples 1 to 5

Pretreatment liquids of the examples except for Example 7 and Comparative Examples 1 to 5 were prepared by the same method as in Example 1 except that the resins used in the pretreatment liquids were changed. A pretreatment liquid of Example 7 was prepared by the same method as in Example 1 except that the malonic acid used as the aggregating agent in Example 1 was changed to calcium acetate and the resin used in the pretreatment liquid was changed.

Further, inks of Examples 2 to 28 and Comparative Examples 1 to 5 were prepared by the same method as in Example 1.

Table 2 shows the physical properties of the resins contained in the pretreatment liquids, the physical properties of each structural unit constituting the resins, and the kind of aggregating agent of each example and each comparative example.

Specifically, the kind of anionic group contained in the resin of the pretreatment liquid, the C log P value of the resin contained in the pretreatment liquid, and the glass transition temperature are listed in the table. In a case where the resin contained in the pretreatment liquid had no anionic group, "—" was shown in the columns for the kind of anionic group.

In regard to the resin, the content of the structural unit (denoted as "C2 unit" in the table) derived from the alkyl (meth)acrylate containing a chain alkyl group having 2 or more carbon atoms is described.

In regard to the structural unit derived from the hydrogen bonding group-containing monomer constituting the resin, the C log P value of the hydrogen bonding group-containing monomer and whether the structural unit derived from the hydrogen bonding group-containing monomer corresponds to the structural unit represented by Formula (1) or Formula (2) (in the table, denoted as "unit (1) or unit (2)") are described. In a case where the structural unit derived from the hydrogen bonding group-containing monomer corresponds to the structural unit represented by Formula (1) or (2), the structural unit thereof is described, and in a case of not corresponding, "—" is described.

In regard to the structural units derived from the anionic group-containing monomer constituting the resins, the C log P value of the anionic group-containing monomer and whether the structural unit derived from the anionic group-containing monomer corresponds to the structural unit represented by Formula (3) or Formula (4) (in the table, denoted as "unit (3) or unit (4)") are described. In a case where the structural unit derived from the anionic group-containing monomer corresponds to the structural unit represented by Formula (3) or (4), the structural unit thereof is described, and in a case of not corresponding, "—" is described.

In regard to the structural units derived from the hydrophobic group-containing monomer constituting the resins, whether the resins had the structural units represented by Formulae (A) to (F) (in the table, denoted as "units (A) to (F)") is described.

Next, image recording was performed using the pretreatment liquids and the inks prepared in each example and each comparative example.

<Image Recording>

An ink jet recording device comprising a transport system for continuously transporting a long impermeable base material, a wire bar coater for coating the impermeable base material with a pretreatment liquid, and an ink jet head for applying an ink to a surface of the impermeable base material onto which the pretreatment liquid had been applied was prepared. Further, a polyethylene terephthalate (PET) base material (product name, "FE2001", manufactured by Futamura Chemical Co., Ltd., thickness of 25 µm, width of 500 mm, length of 2,000 m) was prepared as the impermeable base material.

A cyan solid image was recorded in the following manner while the impermeable base material was continuously transported at 830 mm/sec using an ink jet recording device. The impermeable base material was coated with the pretreatment liquid using a wire bar coater such that the coating amount thereof reached approximately 1.7 g/m$^2$, and the pretreatment liquid was dried at 60° C. for 5 seconds. Next, the ink was applied to the surface of the impermeable base material, which had been coated with the pretreatment liquid, in the form of a solid image under the following application conditions, and the applied ink was dried at 90° C. for 20 seconds, thereby recording a solid image of a cyan color. Both the method of drying the pretreatment liquid and the method of drying the ink were warm air drying.

—Ink Application Conditions—

Ink jet head: 1,200 dpi/20 inch width piezo full line head (here, dpi stands for dot per inch and 1 inch is 2.54 cm)

Amount of ink to be jetted from ink jet head: 4.0 pL

After the image recording, the dot diameter, the streak unevenness, and the adhesiveness were evaluated. In addition, the blocking resistance and the storage stability were evaluated using the pretreatment liquids prepared in each example and each comparative example. The evaluation method is as follows. The evaluation results are listed in Table 2.

<Dot Diameter>

A cyan dot image was recorded by applying the ink in the form of a dot image (halftone dot rate of 3%) instead of the form of a solid image using the same method as the method for the image recording. The dot diameter was measured using a dot analyzer (product name, "DA-6000", manufactured by Oji Scientific Instruments Co., Ltd.). Twenty dots were selected, and the average value of the equivalent circle diameters of the selected dots was defined as the dot diameter. The dot diameter was evaluated according to the following evaluation standards. In the following evaluation standards, the rank in which dots were most satisfactorily spread is set as "AA".

AA: 50 µm or greater
A: 45 µm or greater and less than 50 µm
B: 40 µm or greater and less than 45 µm
C: 35 µm or greater and less than 40 µm
D: 30 µm or greater and less than 35 µm
E: Less than 30 µm <Streak Unevenness>

A region having a size of 50 mm (the transport direction of the impermeable base material)×20 mm (a direction orthogonal to the transport direction of the impermeable base material) in the solid image was set as a "streak unevenness evaluation region". The streak unevenness evaluation region in the solid image was visually observed, and the presence or absence of streak unevenness in parallel with the transport direction of the impermeable base material and the degree of the occurrence of the streak unevenness were confirmed. The streak unevenness of the image was evaluated according to the following evaluation standards. In the following evaluation standards, the rank in which the streak unevenness of the image was most suppressed is set as "AA".

Further, in the following evaluation standards, the streak unevenness which was able to be easily visually recognized is streak unevenness that was able to be visually recognized in a case of being observed at a position separated by 50 cm.

AA: The occurrence of streak unevenness was not visually recognized in the solid image.
A: One extremely thin streak was visually recognized in the solid image.
B: Several extremely thin streaks were visually recognized in the solid image.
C: The number of streaks that were able to be easily visually recognized in the solid image was 2 or more.
D: The number of streaks that were able to be easily visually recognized in the solid image was 3 or more.
E: The number of streaks that were able to be easily visually recognized in the solid image was 4 or more.

<Adhesiveness>

Next, the adhesiveness of the image was evaluated by attaching a piece of tape of Cellotape (registered trademark, No. 405, manufactured by Nichiban Co., Ltd., width of 12 mm, hereinafter, also simply referred to as "tape") onto the solid image 5 minutes after the recording of the solid image (that is, drying of the solid image at 90° C. for 20 seconds) and peeling the piece of tape off from the solid image. Specifically, attaching and peeling of the piece of tape were performed by the following method.

The tape was taken out at a constant speed and cut to have a length of approximately 75 mm, thereby obtaining a piece of tape. The obtained piece of tape was superimposed on the solid image, and a region at the central portion of the piece of tape with a width of 12 mm and a length of 25 mm was attached onto the image using a finger and rubbed firmly with a fingertip. Here, in the solid image, the region with a width of 12 mm and a length of 25 mm to which a piece of tape was attached is hereinafter referred to as an "evaluation region". The end of the piece of tape was grabbed in 5 minutes after attachment of the piece of tape and peeled at an angle as close to 60° as possible in 0.5 seconds to 1.0 seconds. Next, the area ratio (%) of the image remaining on the impermeable base material with respect to the entire evaluation region of the solid image was acquired, and the adhesiveness of the image was evaluated based on the following evaluation standards. In the evaluation standards, the rank of the most excellent adhesiveness of the image is "AA".

AA: The area ratio (%) of the image remaining on the impermeable base material was 95% greater and 100% or less.
A: The area ratio (%) of the image remaining on the impermeable base material was 90% or greater and less than 95%.
B: The area ratio (%) of the image remaining on the impermeable base material was 70% or greater and less than 90%.
C: The area ratio (%) of the image remaining on the impermeable base material was 50% or greater and less than 70%.

D: The area ratio (%) of the image remaining on the impermeable base material was 30% or greater and less than 50%.
E: The area ratio (%) of the image remaining on the impermeable base material was less than 30%.

<Evaluation of Blocking Resistance>

The impermeable base material A was coated with the pretreatment liquid using a wire bar coater such that the coating amount reached approximately 1.7 g/m², and the pretreatment liquid was dried at 60° C. for 5 seconds. The impermeable base material A coated with the pretreatment liquid was cut into a size of 3 cm square. The impermeable base material A coated with the pretreatment liquid and the impermeable base material B provided separately from the impermeable base material A were superimposed such that the surface coated with the pretreatment liquid was positioned inside, and placed at room temperature. A flat rubber plate with a size of 2.5 cm×2.5 cm×0.3 cm was placed on the impermeable base material B. Further, a flat plastic plate with a size of 2.5 cm×2.5 cm×0.3 cm was placed on the rubber plate such that the surfaces with a size of 2.5 cm×2.5 cm overlapped with each other. A weight of 500 g was placed on a plastic plate and allowed to stand for one day. After 1 day, the contact surface of the impermeable base material B with the impermeable base material A coated with the pretreatment liquid was visually observed. The blocking resistance was evaluated according to the following evaluation standard based on the degree of transfer of the components of the pretreatment liquid to the impermeable base material B and the visibility of the impermeable base material B. In the evaluation standards, the rank of the most excellent blocking resistance is "A".

A: The transfer of the components of the pretreatment liquid was not able to be confirmed over the entire rear surface of the impermeable base material B, and the visibility of the transparent portion of the impermeable base material was not impaired.
B: The transfer of the components of the pretreatment liquid was confirmed in greater than 0% and less than 30% of the entire area of the rear surface of the impermeable base material B, and the transparency of the impermeable base material B was slightly impaired within a practically acceptable range.
C: The transfer of the components of the pretreatment liquid was able to be confirmed in 30% or greater and less than 70% of the entire area of the rear surface of the impermeable base material, and the transparency of the impermeable base material was significantly impaired.
D: The transfer of the components of the pretreatment liquid was able to be confirmed in 70% or greater of the entire area of the rear surface of the impermeable base material, and the transparency of the impermeable base material was significantly impaired.

<Storage Stability>

25 g of the pretreatment liquid was accommodated in a 30 mL polyethylene bottle. The bottle in which the pretreatment liquid was accommodated was placed in a thermocell whose temperature was set to 50° C. and stored for 2 weeks. The viscosities of the pretreatment liquid before and after the storage were respectively measured, and Δ viscosity (mPa·s) was calculated according to the following equation.

Δ Viscosity=(Viscosity of pretreatment liquid after storage at 50° C. for 2 weeks)−(viscosity of pretreatment liquid before storage)

Further, the viscosity was measured using a VISCOMETER TV-22 type viscometer (manufactured by Toki Sangyo Co., Ltd.) in a state where the temperature of the pretreatment liquid was adjusted to 25° C. Based on Δ viscosity obtained in the above-described manner, the storage stability of the pretreatment liquid was evaluated according to the following evaluation standards. In the following evaluation standards, the rank of the pretreatment liquid with the most excellent storage stability is set as "A".

A: The Δ viscosity was 0.1 mPa·s or less.
B: The Δ viscosity was greater than 0.1 mPa·s and 0.4 mPa·s or less.
C: The Δ viscosity was greater than 0.4 mPa·s and 1.0 mPa·s or less.
D: The Δ viscosity was greater than 1.0 mPa·s and 2.0 mPa·s or less.
E: The Δ viscosity was greater than 2.0 mPa·s.

TABLE 1

|  | Hydrophobic group-containing monomer | | | | | | Hydrogen bonding group-containing monomer | |
| --- | --- | --- | --- | --- | --- | --- | --- | --- |
|  | Type | Content (% by mass) | Type | Content (% by mass) | Type | Content (% by mass) | Type | Content (% by mass) |
| Example 1 | IBOMA | 44 | St | 20 | — | — | HBA | 25 |
| Example 2 | BzA | 59 | St | 12 | — | — | MAAm | 24 |
| Example 3 | PEA | 40 | St | 27 | — | — | ACMO | 30 |
| Example 4 | BzA | 54 | St | 17 | — | — | DMAAm | 20 |
| Example 5 | CyHA | 60 | St | 15 | — | — | HEAAm | 15 |
| Example 6 | PEA | 65 | — | — | — | — | DAAm | 20 |
| Example 7 | PEA | 65 | — | — | — | — | DAAm | 20 |
| Example 8 | DCPMA | 45 | — | — | — | — | HEA | 30 |
| Example 9 | IBOMA | 30 | BzA | 45 | — | — | PEGMA4 | 20 |
| Example 10 | PEA | 65 | — | — | — | — | PPGA6 | 30 |
| Example 11 | IBOMA | 75 | St | 5 | — | — | HBA | 15 |
| Example 12 | — | — | — | — | — | — | CLA5 | 25 |
| Example 13 | BzA | 54 | St | 12 | — | — | CLA2 | 25 |
| Example 14 | BzMA | 50 | St | 10 | — | — | CLA2 | 30 |
| Example 15 | BzMA | 65 | St | 5 | — | — | CLA2 | 20 |
| Example 16 | BzMA | 65 | St | 10 | — | — | CLA2 | 20 |
| Example 17 | IBOMA | 30 | St | 5 | — | — | PPGA4 | 55 |

TABLE 1-continued

| | | | | | | | | |
|---|---|---|---|---|---|---|---|---|
| Example 18 | BzA | 85 | — | — | — | — | PPGMA4 | 5 |
| Example 19 | PEA | 52 | St | 40 | — | — | HBA | 3 |
| Example 20 | BzA | 56 | St | 10 | — | — | EGMMA | 25 |
| Example 21 | BzA | 54 | St | 12 | — | — | PPGA6 | 25 |
| Example 22 | BzA | 54 | St | 12 | — | — | CLA2 | 25 |
| Example 23 | BzMA | 54 | St | 12 | — | — | PPGA6 | 25 |
| Example 24 | PEA | 50 | St | 20 | — | — | HEMA | 25 |
| Example 25 | BzA | 56 | St | 10 | — | — | HEMA | 25 |
| Example 26 | BzA | 58 | St | 14 | — | — | HEMA | 25 |
| Example 27 | — | — | St | 25 | — | — | DMAEMA | 25 |
| Example 28 | BzA | 42 | St | 20 | — | — | CLA2 | 25 |
| Comparative Example 1 | BzMA | 50 | St | 15 | — | — | CLA2 | 25 |
| Comparative Example 2 | — | — | — | — | — | — | — | — |
| Comparative Example 3 | BzMA | 9 | α-MeSt | 5 | CyHMA | 8 | PEGMA25 | 28 |
| Comparative Example 4 | BzA | 34 | St | 20 | — | — | HBA | 25 |
| Comparative Example 5 | PEA | 19 | St | 20 | — | — | HBA | 40 |

| | Anionic group-containing monomer | | Other monomers | | | | | |
|---|---|---|---|---|---|---|---|---|
| | Type | Content (% by mass) | Type | Content (% by mass) | Type | Content (% by mass) | Type | Content (% by mass) |
| Example 1 | SPMK | 11 | — | — | — | — | — | — |
| Example 2 | SPMK | 5 | — | — | — | — | — | — |
| Example 3 | SEMNa | 3 | — | — | — | — | — | — |
| Example 4 | SPMK | 9 | — | — | — | — | — | — |
| Example 5 | SPAK | 10 | — | — | — | — | — | — |
| Example 6 | SSNa | 15 | — | — | — | — | — | — |
| Example 7 | SSNa | 15 | — | — | — | — | — | — |
| Example 8 | SPAK | 10 | — | — | — | — | — | — |
| Example 9 | SSNa | 5 | — | — | — | — | — | — |
| Example 10 | SPMK | 5 | — | — | — | — | — | — |
| Example 11 | SPMK | 5 | — | — | — | — | — | — |
| Example 12 | SSNa | 10 | — | — | — | — | — | — |
| Example 13 | MAANa | 9 | — | — | — | — | — | — |
| Example 14 | P-1MNa | 10 | — | — | — | — | — | — |
| Example 15 | AMPSNa | 10 | — | — | — | — | — | — |
| Example 16 | SHPANa | 5 | — | — | — | — | — | — |
| Example 17 | SPMK | 10 | — | — | — | — | — | — |
| Example 18 | SPMK | 10 | — | — | — | — | — | — |
| Example 19 | SSNa | 5 | — | — | — | — | — | — |
| Example 20 | SPMK | 9 | — | — | — | — | — | — |
| Example 21 | SPMK | 9 | — | — | — | — | — | — |
| Example 22 | SPMK | 9 | — | — | — | — | — | — |
| Example 23 | SSNa | 9 | — | — | — | — | — | — |
| Example 24 | SSNa | 5 | — | — | — | — | — | — |
| Example 25 | SPMK | 9 | — | — | — | — | — | — |
| Example 26 | SSNa | 3 | — | — | — | — | — | — |
| Example 27 | SSNa | 3 | — | — | THFA | 47 | — | — |
| Example 28 | SPMK | 9 | — | — | EMA | 4 | — | — |
| Comparative Example 1 | — | — | DMAEMA-Cl | 10 | — | — | — | — |
| Comparative Example 2 | — | — | DMAEMA-Cl | 2 | MMA | 70 | EHMA | 28 |
| Comparative Example 3 | — | — | — | — | EHMA | 40 | C12MA | 10 |
| Comparative Example 4 | SPMK | 11 | — | — | nBMA | 10 | — | — |
| Comparative Example 5 | SPMK | 11 | — | — | MMA | 10 | — | — |

TABLE 2

| | Resin | | | C2 unit Content | Anionic group-containing monomer | | Hydrogen bonding group-containing monomer | |
|---|---|---|---|---|---|---|---|---|
| | Type of anionic group | Clog P value | Tg (° C.) | (% by mass) | Clog P value | Unit (1) or unit (2) | Clog P value | Unit (3) or unit (4) |
| Example 1 | Salt of sulfo group | 2.46 | 70 | 0 | −3.607 | Unit (2) | 0.397 | Unit (4) |
| Example 2 | Salt of sulfo group | 1.60 | 33 | 0 | −3.607 | Unit (2) | −0.300 | — |
| Example 3 | Salt of sulfo group | 1.67 | 42 | 0 | −3.663 | Unit (2) | −0.068 | Unit (3) |
| Example 4 | Salt of sulfo group | 1.51 | 40 | 0 | −3.607 | Unit (2) | −0.167 | Unit (3) |
| Example 5 | Salt of sulfo group | 1.58 | 38 | 0 | −3.916 | Unit (2) | −1.027 | Unit (3) |
| Example 6 | Salt of sulfo group | 1.59 | 8 | 0 | −0.911 | Unit (1) | 0.289 | Unit (3) |
| Example 7 | Salt of sulfo group | 1.59 | 8 | 0 | −0.911 | Unit (1) | 0.289 | Unit (3) |
| Example 8 | Salt of sulfo group | 1.68 | 40 | 0 | −3.916 | Unit (2) | −0.006 | Unit (4) |
| Example 9 | Salt of sulfo group | 2.60 | 32 | 0 | −0.911 | Unit (1) | 0.016 | Unit (4) |
| Example 10 | Salt of sulfo group | 1.85 | −35 | 0 | −3.607 | Unit (2) | 1.120 | Unit (4) |
| Example 11 | Salt of sulfo group | 3.75 | 110 | 0 | −3.607 | Unit (2) | 0.397 | Unit (4) |
| Example 12 | Salt of sulfo group | 1.96 | 25 | 0 | −0.911 | Unit (1) | 5.320 | Unit (4) |
| Example 13 | Salt of carboxy group | 1.94 | −2 | 0 | −3.440 | — | 2.095 | Unit (4) |
| Example 14 | Salt of phosphonic acid group | 2.34 | 8 | 0 | −0.111 | — | 2.095 | Unit (4) |
| Example 15 | Salt of sulfo group | 2.00 | 21 | 0 | −4.285 | — | 2.095 | Unit (4) |
| Example 16 | Salt of sulfo group | 2.33 | 13 | 0 | −4.797 | Unit (2) | 2.095 | Unit (4) |
| Example 17 | Salt of sulfo group | 1.79 | 0 | 0 | −3.607 | Unit (2) | 0.943 | Unit (4) |
| Example 18 | Salt of sulfo group | 1.88 | 8 | 0 | −3.607 | Unit (2) | 1.252 | Unit (4) |
| Example 19 | Salt of sulfo group | 2.45 | 20 | 0 | −0.911 | Unit (1) | 0.397 | Unit (4) |
| Example 20 | Salt of sulfo group | 1.60 | 11 | 0 | −3.607 | Unit (2) | 0.822 | Unit (4) |
| Example 21 | Salt of sulfo group | 1.71 | −15 | 0 | −3.607 | Unit (2) | 1.210 | Unit (4) |
| Example 22 | Salt of sulfo group | 2.17 | −5 | 0 | −3.607 | Unit (2) | 2.095 | Unit (4) |
| Example 23 | Salt of sulfo group | 1.81 | 23 | 0 | −0.911 | Unit (1) | 1.210 | Unit (4) |
| Example 24 | Salt of sulfo group | 1.89 | 19 | 0 | −0.911 | Unit (1) | 0.303 | Unit (4) |
| Example 25 | Salt of sulfo group | 1.47 | 27 | 0 | −3.607 | Unit (2) | 0.303 | Unit (4) |
| Example 26 | Salt of sulfo group | 1.94 | 28 | 0 | −0.911 | Unit (1) | 0.303 | Unit (4) |
| Example 27 | Salt of sulfo group | 1.58 | 23 | 0 | −0.911 | Unit (1) | 1.275 | — |
| Example 28 | Salt of sulfo group | 1.91 | 2 | 4 | −3.607 | Unit (2) | 2.095 | Unit (4) |
| Comparative Example 1 | — | 2.55 | 14 | 0 | — | — | 2.095 | Unit (4) |
| Comparative Example 2 | — | 2.11 | 52 | 28 | — | — | — | — |
| Comparative Example 3 | — | 2.21 | −14 | 50 | — | — | −3.671 | Unit (4) |
| Comparative Example 4 | Salt of sulfo group | 1.42 | 14 | 10 | −3.607 | Unit (2) | 0.397 | Unit (4) |
| Comparative Example 5 | Salt of sulfo group | 1.23 | 7 | 0 | −3.607 | Unit (2) | 0.397 | Unit (4) |

| | Hydrophobic group-containing monomer Presence of units (A) to (F) | Aggregating agent | Dot diameter | Streak unevenness | Adhesiveness | Blocking resistance | Storage stability |
|---|---|---|---|---|---|---|---|
| Example 1 | Present | Acid | A | A | B | A | A |
| Example 2 | Present | Acid | B | B | B | A | A |
| Example 3 | Present | Acid | B | B | B | A | A |
| Example 4 | Present | Acid | B | B | A | A | A |
| Example 5 | Present | Acid | B | B | AA | A | A |
| Example 6 | Present | Acid | A | A | A | A | A |
| Example 7 | Present | Polyvalent metal salt | A | B | A | A | A |
| Example 8 | Present | Acid | B | B | A | A | A |
| Example 9 | Present | Acid | B | B | A | A | A |
| Example 10 | Present | Acid | B | B | C | D | C |
| Example 11 | Present | Acid | A | A | C | B | A |
| Example 12 | Absent | Acid | A | A | B | A | A |
| Example 13 | Present | Acid | A | B | AA | A | B |
| Example 14 | Present | Acid | A | B | AA | A | B |
| Example 15 | Present | Acid | A | A | AA | A | A |
| Example 16 | Present | Acid | A | A | AA | A | A |
| Example 17 | Present | Acid | B | B | A | A | A |
| Example 18 | Present | Acid | AA | AA | A | A | A |
| Example 19 | Present | Acid | AA | AA | B | A | A |
| Example 20 | Present | Acid | AA | AA | B | A | A |
| Example 21 | Present | Acid | AA | AA | AA | A | A |
| Example 22 | Present | Acid | AA | AA | AA | A | A |

TABLE 2-continued

| | | | | | | | |
|---|---|---|---|---|---|---|---|
| Example 23 | Present | Acid | AA | AA | AA | A | A |
| Example 24 | Present | Acid | AA | AA | AA | A | A |
| Example 25 | Present | Acid | AA | AA | AA | A | A |
| Example 26 | Present | Acid | AA | AA | AA | A | A |
| Example 27 | Present | Acid | A | A | B | A | A |
| Example 28 | Present | Acid | B | B | A | A | A |
| Comparative Example 1 | Present | Acid | C | D | D | A | D |
| Comparative Example 2 | Absent | Acid | E | E | D | A | D |
| Comparative Example 3 | Present | Acid | E | E | A | A | D |
| Comparative Example 4 | Present | Acid | D | E | A | A | A |
| Comparative Example 5 | Present | Acid | D | D | A | C | A |

As listed in Tables 1 and 2, it was found that in Examples 1 to 25, since each of the pretreatment liquids contained an anionic resin and an aqueous medium, the C log P value of the anionic resin was 1.40 or greater, and the content of the structural unit derived from the alkyl (meth)acrylate containing a chain alkyl group having 2 or more carbon atoms in the anionic resin was less than 5% by mass with respect to the total mass of the anionic resin, the dot diameter was large.

On the contrary, in Comparative Example 1, since the pretreatment liquid contained a cationic resin in place of the anionic resin, the dot diameter was small, the streak unevenness was confirmed in the image, and the adhesiveness of the image to the impermeable base material was degraded.

In Comparative Example 2, the pretreatment liquid contained a cationic resin in place of the anionic resin, and the cationic resin contained 5% by mass or greater of a structural unit derived from an alkyl (meth)acrylate containing a chain alkyl group having 2 or more carbon atoms with respect to the total mass of the cationic resin. Therefore, the dot diameter was small, the streak unevenness was significantly confirmed in the image, and the adhesiveness of the image to the impermeable base material was degraded.

In Comparative Example 3, since the pretreatment liquid contained a nonionic resin in place of the anionic resin, the dot diameter was extremely small and the streak unevenness was significantly confirmed in the image.

In Comparative Example 4, since the anionic resin contained in the pretreatment liquid contained 5% by mass or greater of a structural unit derived from an alkyl (meth) acrylate containing a chain alkyl group having 2 or more carbon atoms with respect to the total mass of the anionic resin, the dot diameter was extremely small, and the streak unevenness was significantly confirmed in the image.

In Comparative Example 5, since the C log P value of the anionic resin contained in the pretreatment liquid was less than 1.40, the dot diameter was extremely small and the streak unevenness was significantly confirmed in the image.

In Example 22, it was found that since the C log P value of the anionic group-containing monomer was −4.00 or greater, the dot diameter was larger and the streak unevenness of the image was further suppressed as compared with Examples 15 and 16.

In Example 22, it was found that since the anionic resin contained a salt of a sulfo group, the dot diameter was larger, the streak unevenness of the image was further suppressed, and the storage stability of the pretreatment liquid was excellent as compared with Examples 13 and 14.

In Example 22, it was found that since the anionic resin had a structural unit represented by Formula (2), the dot diameter was larger and the streak unevenness of the image was further suppressed as compared with Example 15.

In Examples 21 to 25, it was found that since the anionic resin had a structural unit derived from a hydrogen bonding group-containing monomer and the C log P value of the hydrogen bonding group-containing monomer was 0.20 or greater, the dot diameter was larger and the streak unevenness of the image was further suppressed as compared with Examples 2 to 5, 8, and 9.

In Examples 21 to 25, it was found that the resin had a structural unit represented by Formula (4), the adhesiveness to the impermeable base material was more excellent as compared with Example 27.

In Examples 21 to 25, it was found that since the resin had a structural unit represented by Formula (4), and $Y^3$ in Formula (4) represents —OH, the adhesiveness to the impermeable base material was excellent as compared with Examples 6 and 20.

In Examples 21 to 25, it was found that since the content of the structural unit derived from the hydrogen bonding group-containing monomer was 5% by mass or greater with respect to the total mass of the anionic resin, the adhesiveness to the impermeable base material was excellent as compared with Example 19. Further, in Examples 21 to 25, it was found that since the content of the structural unit derived from the hydrogen bonding group-containing monomer was 50% by mass or less with respect to the total mass of the anionic resin, the dot diameter was larger and the streak unevenness of the image was further suppressed as compared with Example 17.

In Examples 21 to 25, it was found that since the anionic resin contained at least one selected from the group consisting of structural units represented by Formulae (A) to (F), the adhesiveness to the impermeable base material was more excellent as compared with Example 12.

In Examples 21 to 25, it was found that since the glass transition temperature of the anionic resin was −30° C. or higher, the adhesiveness to the impermeable base material, the blocking resistance, and the storage stability of the pretreatment liquid were excellent, the dot diameter was larger, and the streak unevenness of the image was suppressed as compared with Example 10. Further, in Examples 21 to 25, it was found that since the glass transition temperature of the anionic resin was lower than −100° C., the adhesiveness to the impermeable base material was more excellent as compared with Example 11.

As described above, the example group using the cyan ink as the ink has been described. However, it goes without saying that the same effects as those of the above-described example group can be obtained even in a case where the cyan ink was changed to an ink other than the cyan ink (for example, magenta ink, yellow ink, or black ink) in the example group or in a case where a polychromic image was recorded using the cyan ink and at least one ink other than the cyan ink.

What is claimed is:

1. A pretreatment liquid for an impermeable base material, comprising:
an anionic resin; and
an aqueous medium,
wherein the anionic resin has a C log P value of 1.40 or greater,
a content of a structural unit derived from an alkyl (meth)acrylate containing a chain alkyl group having 2 or more carbon atoms in the anionic resin is less than 3% by mass with respect to a total mass of the anionic resin,
the anionic resin has a structural unit derived from an anionic group-containing monomer,
the anionic group-containing monomer has a C log P value of −4.00 or greater,
the anionic resin has a structural unit derived from a hydrogen bonding group-containing monomer,
the hydrogen bonding group-containing monomer has a C log P value of 0.20 or greater, and
the structural unit derived from the hydrogen bonding group-containing monomer is at least one selected from the group consisting of a structural unit represented by Formula (3) and a structural unit represented by Formula (4),

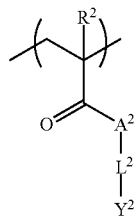

(3)

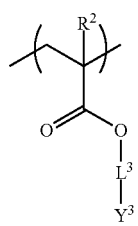

(4)

in Formulae (3) and (4), $R^2$'s each independently represent a hydrogen atom or an alkyl group having 1 to 4 carbon atoms,
in Formula (3), $A^2$ represents —NH— or —N($L^4$-$Y^4$)—, $L^2$ represents a divalent group which is one selected from the second group consisting of an alkylene group, an alkenylene group, an alkynylene group, an arylene group, —O—, —NH—, —N($L^4$-$Y^4$)—, and —C(=O)—, a divalent group which is obtained by combining two or more selected from the second group, or a single bond, $Y^2$ represents an alkyl group, an alkenyl group, an alkynyl group, an aryl group, a halogen atom, —OH, or —$OR^3$, and two of $A^2$, $L^2$, and $Y^2$ may be linked to each other to form a ring,
in Formula (4), $L^3$ represents a divalent group which is one selected from the second group or a divalent group which is obtained by combining two or more selected from the second group, $Y^3$ represents a halogen atom, or —OH, $L^3$ and $Y^3$ may be linked to each other to form a ring, $L^4$ represents a divalent group which is one selected from the third group consisting of an alkylene group, an alkenylene group, an alkynylene group, an arylene group, —O—, —NH—, and —C(=O)—, a divalent group which is obtained by combining two or more selected from the third group, or a single bond, $Y^4$ represents an alkyl group, an alkenyl group, an alkynyl group, an aryl group, a halogen atom, —OH, —$OR^3$, —$NH_2$, —$NR^3H$, —$NR^3R^4$, or —C(=O) $R^3$, and $R^3$ and $R^4$ each independently represent an alkyl group, an alkenyl group, an alkynyl group, or an aryl group, and
in Formulae (3) and (4), $L^4$ and $Y^4$ in —N($L^4$-$Y^4$)— may be linked to each other to form a ring, and $R^3$ and $R^4$ in —$NR^3R^4$ may be linked to each other to form a ring,
a content of the structural unit derived from the hydrogen bonding group-containing monomer is in a range of from 5% by mass to 25% by mass with respect to the total mass of the anionic resin,
the anionic resin has at least one group selected from the group consisting of a sulfo group and a salt of the sulfo group,
the anionic resin has at least one structural unit selected from the group consisting of structural units represented by the following Formulae (A) to (F):

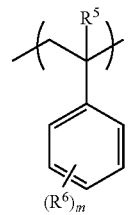

(A)

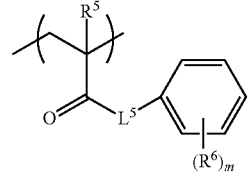

(B)

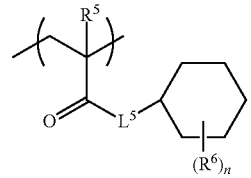

(C)

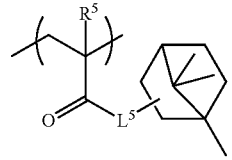

(D)

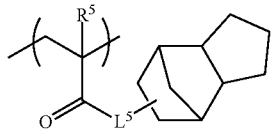

(E)

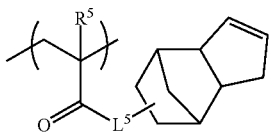

(F)

wherein, in Formulae (A) to (F), each $R^5$ independently represents a hydrogen atom or a methyl group, each $R^6$ independently represents an alkyl group, an alkenyl group, or an alkynyl group, m represents an integer from 0 to 5, n represents an integer from 0 to 11, and $L^5$ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond, and, the anionic resin has a glass transition temperature of −30° C. or higher and lower than 60° C.

2. The pretreatment liquid for an impermeable base material according to claim 1, wherein the anionic resin has at least one structural unit selected from the group consisting of a structural unit represented by Formula (1) and a structural unit represented by Formula (2),

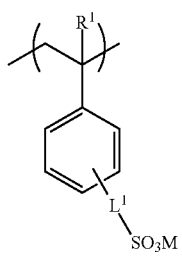

(1)

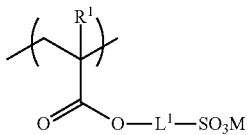

(2)

in Formulae (1) and (2), $R^1$'s each independently represent a hydrogen atom or a methyl group, $L^1$'s each independently represent a divalent group which is one selected from the first group consisting of an alkylene group having 1 to 10 carbon atoms, an arylene group having 6 to 10 carbon atoms, —O—, —NH—, —S—, —C(=O)—, and —CH(—OH)—, a divalent group which is obtained by combining two or more selected from the first group, or a single bond, and M's each independently represent a hydrogen atom or a cation.

3. The pretreatment liquid for an impermeable base material according to claim 1,
wherein $Y^2$ in Formula (3) and $Y^3$ in Formula (4) represent —OH.

4. An ink set comprising:
the pretreatment liquid for an impermeable base material according to claim 1; and
an ink containing a colorant and water.

5. A base material for image recording, comprising:
an impermeable base material; and
a pretreatment layer which is provided on at least one surface of the impermeable base material and contains a solid content in the pretreatment liquid for an impermeable base material according to claim 1.

6. An image recorded material comprising:
an impermeable base material; and
an image which includes a pretreatment layer provided on at least one surface of the impermeable base material and containing a solid content in the pretreatment liquid for an impermeable base material according to claim 1, and a colorant.

7. A method of producing a base material for image recording, comprising:
a step of applying the pretreatment liquid for an impermeable base material according to claim 1 onto an impermeable base material.

8. An image recording method comprising:
a step of applying the pretreatment liquid for an impermeable base material according to claim 1 onto an impermeable base material; and
a step of applying an ink containing a colorant and water onto a surface of the impermeable base material onto which the pretreatment liquid for an impermeable base material has been applied, using an ink jet recording method to record an image.

* * * * *